United States Patent
Shimizu et al.

(10) Patent No.: US 8,069,326 B2
(45) Date of Patent: Nov. 29, 2011

(54) RELOCATION SYSTEM AND A RELOCATION METHOD

(75) Inventors: Tomoto Shimizu, Kawasaki (JP); Nobuo Beniyama, Yokohama (JP); Tomoyuki Kaji, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 912 days.

(21) Appl. No.: 11/624,884

(22) Filed: Jan. 19, 2007

(65) Prior Publication Data
US 2008/0104350 A1 May 1, 2008

(30) Foreign Application Priority Data
Oct. 30, 2006 (JP) ................................. 2006-294063

(51) Int. Cl.
*G06F 12/08* (2006.01)

(52) U.S. Cl. ............ 711/165; 711/6; 711/154; 711/158; 711/170; 711/171; 711/172; 711/204; 711/E12.002; 710/20; 710/21; 710/31; 710/33; 710/57; 710/60

(58) Field of Classification Search .............. 711/6, 154, 711/158, 165, 170, 171, 172, 204, E12.002; 710/20, 21, 31, 33, 57, 60
See application file for complete search history.

(56) References Cited

U.S. PATENT DOCUMENTS

| 7,096,338 | B2 | 8/2006 | Takahashi et al. | |
|---|---|---|---|---|
| 2006/0242376 | A1 | 10/2006 | Tsuge et al. | |
| 2007/0050588 | A1* | 3/2007 | Tabata et al. | 711/165 |
| 2010/0042797 | A1* | 2/2010 | Asano et al. | 711/165 |

FOREIGN PATENT DOCUMENTS

| JP | 2006-99748 | 4/2006 |
|---|---|---|
| JP | 2006-302077 | 11/2006 |

* cited by examiner

*Primary Examiner* — Midys Rojas
(74) *Attorney, Agent, or Firm* — Brundidge & Stanger, P.C.

(57) ABSTRACT

Provided are a relocation system and a relocation method capable of relocating a virtual volume that is formed based on thin provisioning while ensuring security against exhaustion of pools. A database stores attribute information for pools and virtual volumes for thin provisioning that exist in a storage device as well as parameters for predicting time period till exhaustion of the pools. When a virtual volume is to be relocated between a plurality of pools, a relocation control section predicts time periods till exhaustion of the pools before and after relocation based on information in the database and determines the relocation is possible or not based on the result of prediction or determines an appropriate relocation plan. This enables control of relocation of virtual volumes.

12 Claims, 40 Drawing Sheets

FIG. 5A

VIRTUAL VOLUME TABLE — 300 (210)

| VIRTUAL VOLUME ID (301) | POOL ID (302) | VIRTUAL CAPACITY (303) | ACTUAL USAGE AMOUNT (304) |
|---|---|---|---|
| 0000 | 00 | 10000MB | 750MB |
| 0001 | 00 | 5000MB | 500MB |

FIG. 5B

POOL TABLE — 310 (211)

| POOL ID (311) | CAPACITY (312) | ACTUAL USAGE AMOUNT (313) | PAGE SIZE (314) | RAID TYPE (315) | PERFORMANCE TYPE (316) |
|---|---|---|---|---|---|
| 00 | 10000MB | 1250MB | 4KB | RAID5 | FC |
| 01 | 150000MB | 10000MB | 16KB | RAID0 | SATA |

FIG. 5C

VIRTUAL VOLUME USAGE AMOUNT PREDICTION FUNCTION TABLE — 320 (212)

| VIRTUAL VOLUME ID (321) | LINEAR COEFFICIENT (322) |
|---|---|
| 0000 | 50 MB/DAY |
| 0001 | 6 MB/DAY |

FIG. 5D

VIRTUAL VOLUME USAGE AMOUNT HISTORY TABLE — 330 (213)

| VIRTUAL VOLUME ID (331) | TIME (332) | ACTUAL USAGE AMOUNT (333) |
|---|---|---|
| 0000 | 2006/09/11 01:00 | 748MB |
| 0000 | 2006/09/11 02:00 | 750MB |
| 0001 | 2006/09/11 01:00 | 500MB |

FIG. 19

LEVELING PLAN CONFIRMATION SCREEN 11s01, 11s02

VIRTUAL VOLUME ID TO BE MOVED: 0000

| POOL ID | PREDICTED REMAINING OPERATION PERIOD | |
|---|---|---|
| | BEFORE RELOCATION | AFTER RELOCATION |
| 00 | 80 DAYS | 170 DAYS |
| 01 | 350 DAYS | 170 DAYS |

SOURCE POOL 11s11
DESTINATION POOL
11s21
11s12, 11s22
11s13, 11s23

CARRY OUT THIS RELOCATION PLAN ?

[ OK ] 11s31    [ CANCEL ] 11s32

FIG. 29A

TIER TABLE (214, 340)

| TIER ID (341) | CONDITION FORMULA (342) | TIER TYPE (344) |
|---|---|---|
| HIGH-SPEED | PERFORMANCE TYPE = FC and RAID TYPE = RAID5 and PREDICTED REMAINING OPERATION PERIOD >= 7 DAYS | POOL |
| HIGHEST-SPEED | PERFORMANCE TYPE = FC and RAID TYPE = RAID5 | GENERAL VOLUME |

FIG. 29B

POLICY TABLE (215, 350)

| POLICY ID (351) | PRIORITY (352) | TIER (353) | CAPACITY EFFICIENCY (354) |
|---|---|---|---|
| RELIABILITY-COMPROMISED | 1 | HIGH-SPEED AND HIGH RELIABILITY | — |
| RELIABILITY-COMPROMISED | 2 | HIGH-SPEED | — |
| PERFORMANCE-COMPROMISED | 1 | HIGH-SPEED | — |

FIG. 29C

RELOCATION STATUS TABLE (216, 360)

| VIRTUAL VOLUME ID (361) | LAST APPLIED POLICY (362) | LAST APPLIED PRIORITY (363) |
|---|---|---|
| 0000 | RELIABILITY-COMPROMISED | 2 |
| 0001 | PERFORMANCE-COMPROMISED | 1 |

FIG. 29D

GENERAL VOLUME TABLE (217, 370)

| GENERAL VOLUME ID (371) | CAPACITY (372) | RAID TYPE (373) | PERFORMANCE TYPE (374) | USAGE STATE (375) |
|---|---|---|---|---|
| 9000 | 4GB | RAID5 | FC | IN USE |
| 9001 | 4GB | RAID5 | FC | UNUSED |

FIG. 30A

Tier Table (214)

| TIER ID | CONDITION FORMULA | TIER TYPE | |
|---|---|---|---|
| HIGH-SPEED AND HIGH-RELIABILITY | PERFORMANCE TYPE = FC and RAID TYPE = RAID1 and PREDICTED REMAINING OPERATION PERIOD >= 14 DAYS | POOL | 340a |
| HIGH-SPEED | PERFORMANCE TYPE = FC and RAID TYPE = RAID5 and PREDICTED REMAINING OPERATION PERIOD >= 7 DAYS | POOL | 340b |
| LOW-SPEED | PERFORMANCE TYPE = SATA and RAID TYPE = RAID5 and PREDICTED REMAINING OPERATION PERIOD >= 7 DAYS | POOL | 340c |
| VERY HIGH-SPEED | PERFORMANCE TYPE = FC and RAID TYPE = RAID5 | GENERAL VOLUME | 340d |

FIG. 30B

Policy Table (215)

| POLICY ID | PRIORITY | TIER | CAPACITY EFFICIENCY | |
|---|---|---|---|---|
| RELIABILITY-COMPROMISED | 1 | HIGH-SPEED AND HIGH-RELIABILITY | — | 350a |
| RELIABILITY-COMPROMISED | 2 | HIGH-SPEED | — | 350b |
| PERFORMANCE-COMPROMISED | 1 | HIGH-SPEED | — | 350c |
| PERFORMANCE-COMPROMISED | 2 | LOW-SPEED | — | 350d |
| COST-COMPROMISED | 1 | HIGH-SPEED | — | 350e |
| COST-COMPROMISED | 2 | HIGH-SPEED AND HIGH-RELIABILITY | — | 350f |
| COST-COMPROMISED | 3 | VERY HIGH-SPEED | 60% | 350g |

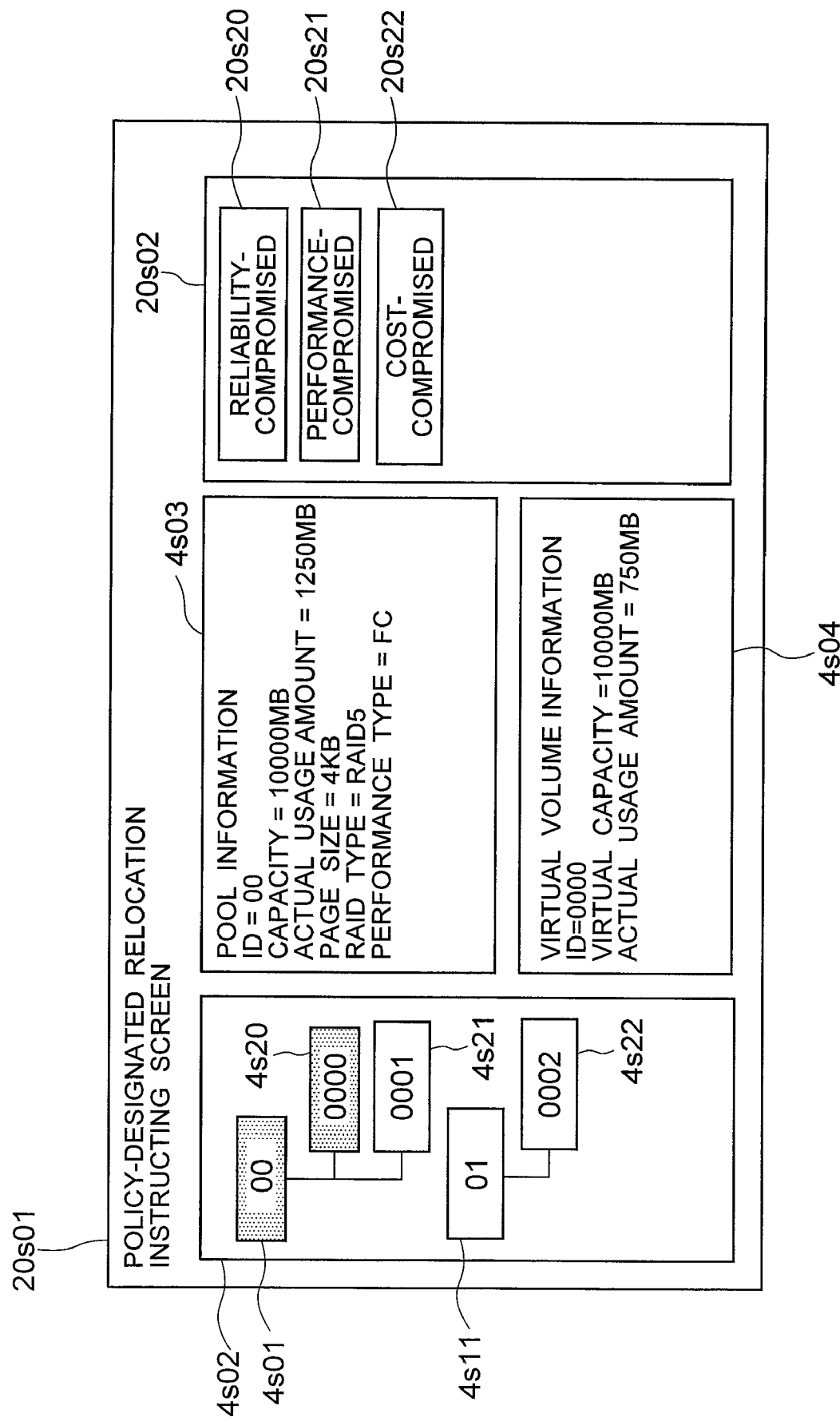

FIG. 33

DESTINATION CANDIDATE POOL LIST TABLE — 20t05

DESTINATION TIER = HIGH-SPEED — 20t06

| POOL ID | PREDICTED REMAINING OPERATION PERIOD | SELECTION BUTTON |
|---------|--------------------------------------|------------------|
| 00      | 100 DAYS                             | SELECT           |
| 08      | 70 DAYS                              | SELECT           |

20t51 / 20t52 / 20t53 / 20t54 / 20t55

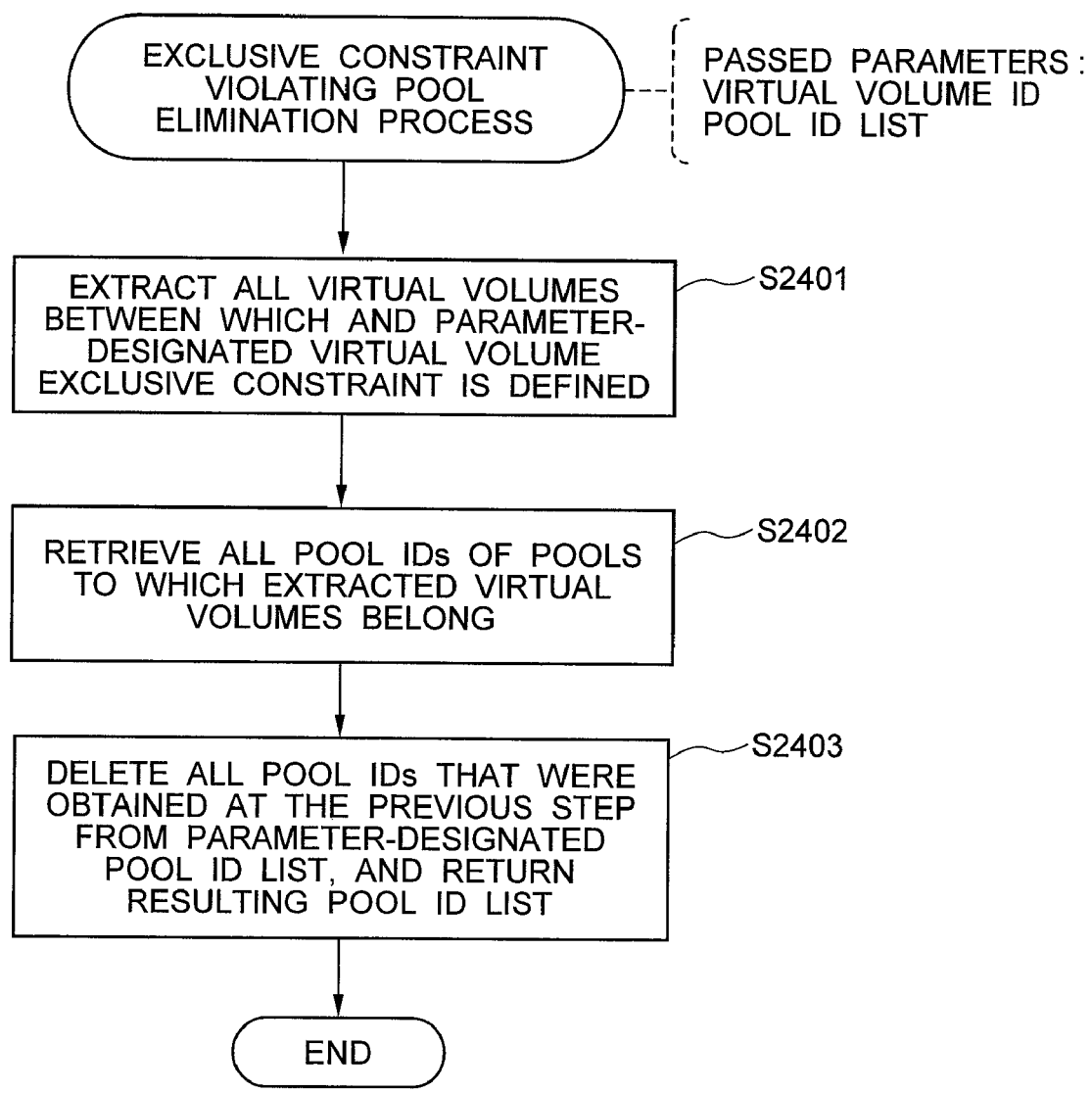

RELOCATION SYSTEM AND A RELOCATION METHOD

INCORPORATION BY REFERENCE

The present application claims priority from Japanese application JP2006-294063 filed on Oct. 30, 2006, the content of which is hereby incorporated by reference into this application.

BACKGROUND OF THE INVENTION

1. Field of the Invention

The present invention relates to a relocation system and a relocation method capable of relocating a virtual volume that is formed based on thin provisioning while ensuring security against exhaustion of pools.

2. Description of Related Art

In general, data managed in an organization such as a company is stored in a storage device called a disk array subsystem or the like. This storage device has a plurality of storage units such as hard disk drives to form Redundant Array of Inexpensive Disks (RAID) on which logical storage areas called volumes are formed. A host computer (hereinafter referred to as "host") accesses the storage units via these volumes to read/write data.

In recent years, amount of data managed in organizations such as companies continues to increase year after year and effective utilization of storage devices has become an issue of great importance. To address this issue, there are conventional techniques like tiered storage management and thin provisioning, and thin provisioning has become a technique for increasing efficiency of utilization of storage device capacity.

JP-A-2006-99748 discloses a method for tiered storage management that classifies volumes into groups called tiers according to their characteristics and appropriately positions data in a volume that has characteristics appropriate for the value of the data so as to effectively utilize storage.

For a general volume not based on thin provisioning (hereinafter called "general volume"), an area equivalent to the total capacity of the volume is allocated in a storage unit when creating volumes. On the other hand, in thin provisioning, a plurality of general volumes are pooled and virtualized volumes (hereinafter "virtual volume") are formed thereon. The virtual volumes are then exposed to the host and a physical storage area is allocated from a general volume in the pools and assigned only to a data block in which data is actually written.

Its advantage is that, even when virtual volumes of a large capacity are created, only general volumes that are actually used by the host have to be prepared, which increases efficiency of utilization of storage device capacity. A drawback is that when available space in general volumes within a pool runs out, it is no longer possible to write data to all virtual volumes formed in that pool. Thus, a user (or a manager of the storage device) needs to estimate increase in usage of a pool and perform maintenance operations as necessary such as addition of general volumes to the pool so that the pool does not run out during operation.

Use of thin provisioning and tiered storage management in combination would promote effective utilization of storage. That is, it is expected that, by classifying pools into tiers according to their characteristics and relocating virtual volumes among a plurality of pools that belong to different tiers, users can enjoy advantages of both thin provisioning and tiered storage management.

The conventional technique mentioned above has problems as described below and is far from being able to adequately support effective utilization of storage by users when applied to thin provisioning.

A first problem is that risk of pool exhaustion increases. This is because it is difficult to estimate increase in usage amount of pools after relocation since trend in usage amount of the individual pools largely changes as a result of relocating a virtual volume among the pools. In the worst case, it is possible that, as a result of executing relocation, a time period before a destination pool runs out (hereinafter referred to as "remaining operation period") becomes short and a user cannot take action in time.

A second problem is that relocation is difficult to utilize as means for adjusting available space in pools. For example, if the user finds a pool that is likely to run out soon and tries to extend the time before its exhaustion by moving a virtual volume formed in that pool to another pool, it is difficult to determine which virtual volume should be relocated to which pool in order to extend the time before its exhaustion most effectively.

SUMMARY OF THE INVENTION

The present invention is an invention intended to solve those problems outlined above and has an object of providing a relocation system and a relocation method capable of relocating a virtual volume that is formed on thin provisioning while ensuring security against exhaustion of pools.

To attain the above object, a management server that manages arrangement of virtual volumes is characterized by including a prediction section (e.g., remaining operation period prediction process S202) that predicts time periods before pools run out and a relocation section (e.g., relocation execution process S200) that relocates the virtual volumes among the plurality of pools based on the result of prediction by the prediction section. With this configuration, it is possible to predict time periods before the pools run out before and after relocation of a virtual volume and to control relocation of the virtual volumes based on the result of prediction.

According to the present invention, it is possible to relocate a virtual volume that is formed on thin provisioning while ensuring security against pool exhaustion.

Other objects, features and advantages of the invention will become apparent from the following description of the embodiments of the invention taken in conjunction with the accompanying drawings.

BRIEF DESCRIPTION OF THE DRAWINGS

FIG. 5A shows the structure of a volume table in the database shown in FIG. 4;

FIG. 5B shows the structure of a pool table in the database shown in FIG. 4;

FIG. 5C shows the structure of a virtual volume usage amount prediction function table in the database shown in FIG. 4;

FIG. 5D shows the structure of a virtual volume usage amount history table in the database shown in FIG. 4;

FIG. 19 illustrates an example of specific display of a leveling plan confirmation screen;

FIG. 29A shows the structure of a tier table;

FIG. 29B shows the structure of a policy table;

FIG. 29C shows the structure of a relocation status table;

FIG. 29D shows the structure of a general volume table;

FIG. 30A shows a structure of a tier table;

FIG. 30B shows a structure of a policy table;

FIG. 31 illustrates a screen for instructing policy-designated relocation;

FIG. 33 illustrates an example of specific display of a list table of destination candidate pools;

FIG. 40 is a flowchart illustrating an exclusion constraint violating pool elimination process.

DESCRIPTION OF THE EMBODIMENTS

Embodiments of the present invention will be described with reference to the accompanying drawings.

Figure 1:
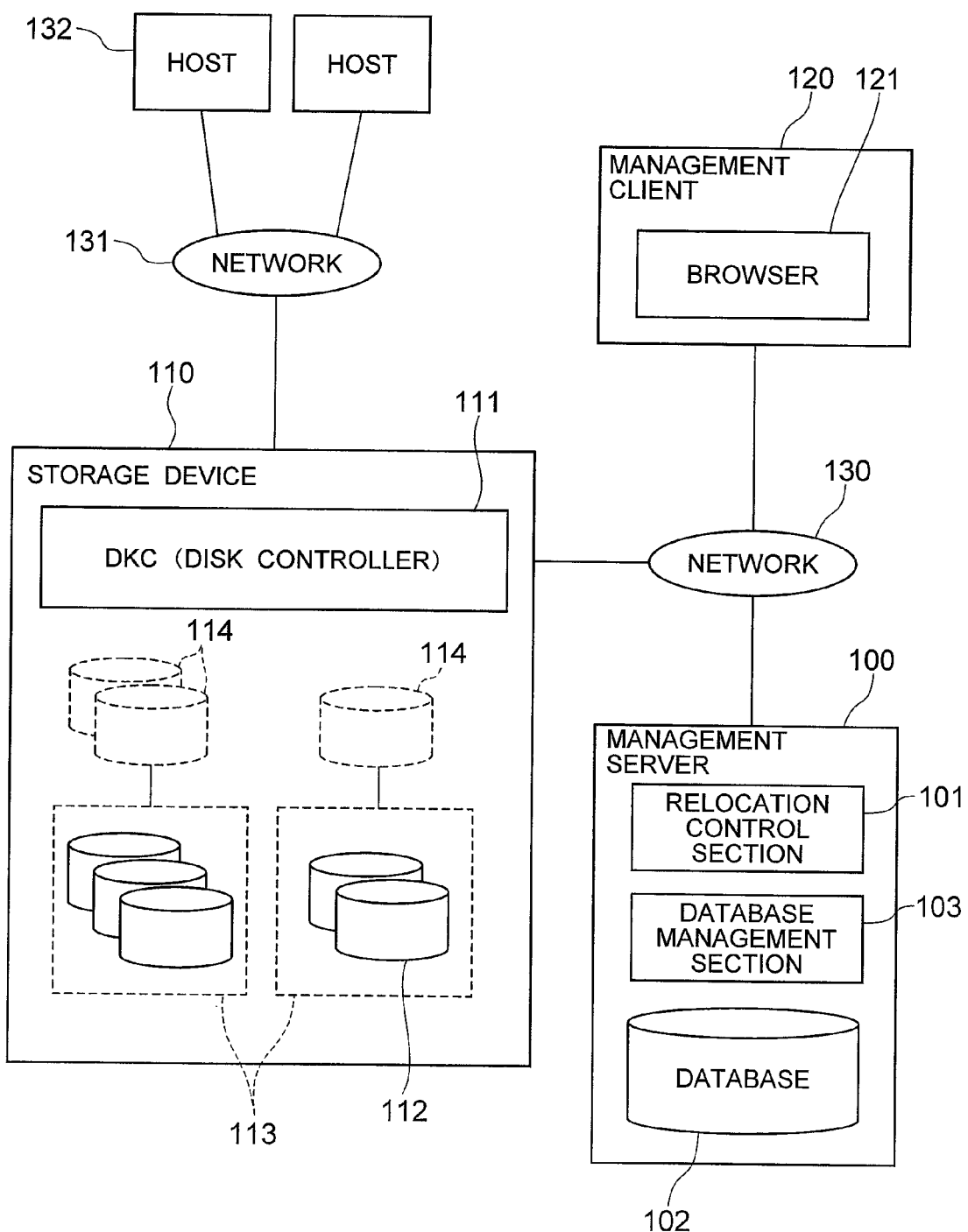
FIG. 1 shows the configuration of a relocation system according to the present invention.

FIG. 1 shows the configuration of a relocation system according to the present invention. A storage device 110 includes a DKC (disk controller) 111 and a plurality of general volumes 112. Each of the general volumes 112 is identified by an identifier which is unique in the DKC 111 (hereinafter called "general volume ID"). Storage units corresponding to the general volumes 112 may be storage units contained in the storage device 110 or may be storage units that exist outside the storage device 110, e.g., ones contained in another storage device connected to the storage device 110.

Pools 113 are collection of the general volumes 112 that are recognized as pools for thin provisioning by the DKC 111. A plurality of the pools 113 can exist for the DKC 111 and each of the pools is identified by a unique identifier (hereinafter called "pool ID").

Virtual volumes 114 are virtual volumes for thin provisioning that are formed in the pools 113 by the DKC 111. A plurality of the virtual volumes 114 can exist for one pool 113 and each virtual volume 114 is identified by an identifier that is unique in the DKC 111 (hereinafter called "virtual volume ID"). The virtual volumes 114 can be accessed as volumes by a host 132 which is connected to the DKC 111 over a network 131. The network 131 may be a Storage Area Network (SAN), for example.

A management server 100 is a server computer that includes a relocation control section 101, a database 102 that can be accessed by the relocation control section 101, and a database management section 103 that manages the database 102. A management client 120 is a client computer that has a browser 121. The management server 100, the management client 120, and the DKC 111 are interconnected by the network 130. The network 130 may be a Local Area Network (LAN), for example.

The relocation control section 101 is a module that accesses the database 102 via the database management section 103 and also communicates with the browser 121 and the DKC 111 to execute various types of processing associated with relocation.

The DKC 111 manages various information on the pools 113 and the virtual volumes 114 (e.g., lists of the pools 113 and the virtual volumes 114, relations between the pools 113 and the virtual volumes 114, attribute information such as the capacity or actual usage amount of the pools 113 and the virtual volumes 114), and has an interface for passing such information to the management server 100. The DKC 111 also has an interface for relocating a designated virtual volume 114 to a designated different pool 113 in accordance with a request from the management server 100. The DKC 111 also has an interface for relocating a designated virtual volume 114 to another unused general volume 112 in accordance with a request from the management server 100.

Figure 2:
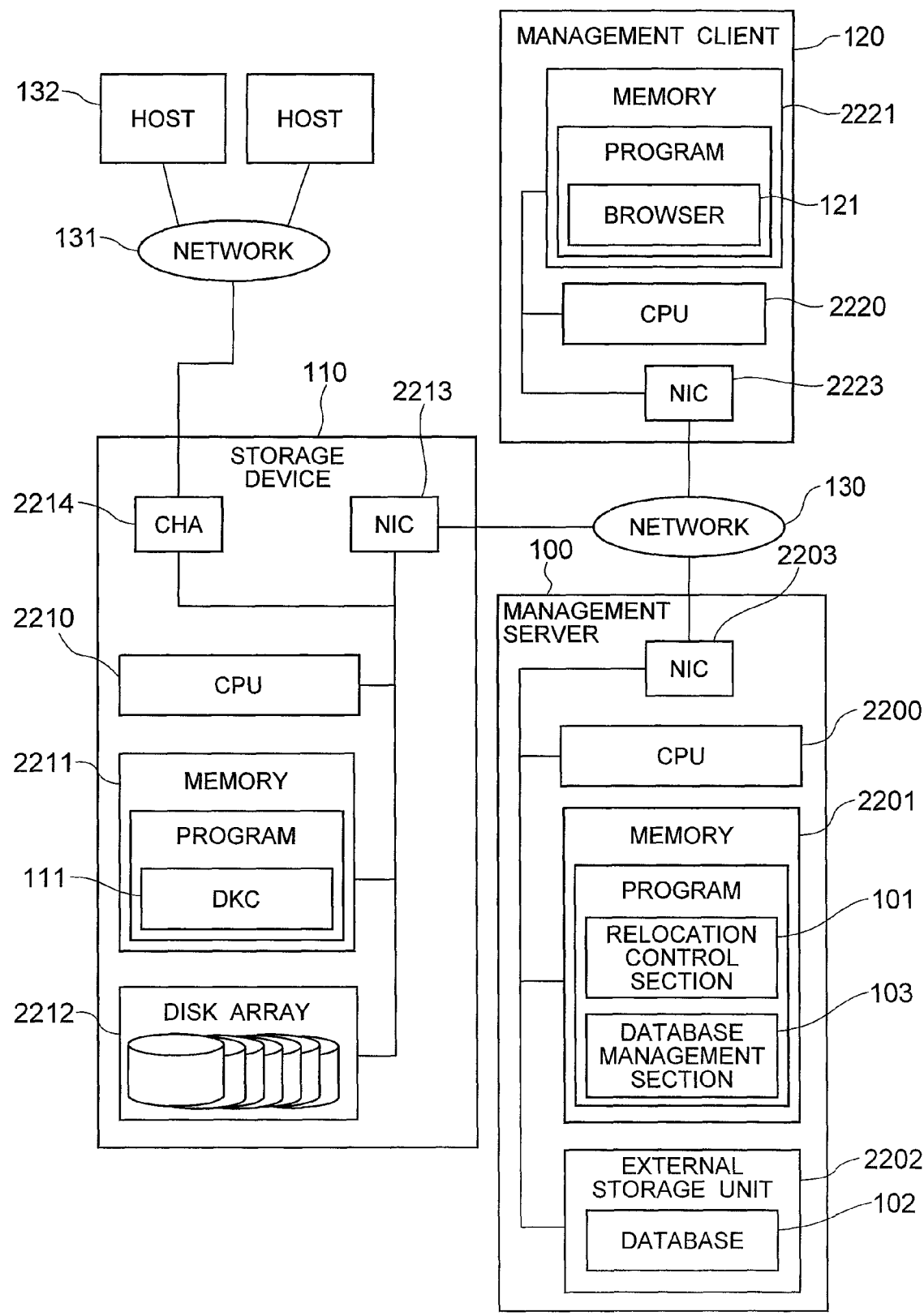
FIG. 2 shows the hardware configurations of the devices shown in FIG. 1.

FIG. 2 shows the hardware configurations of the devices shown in FIG. 1. The management server 100 includes a Central Processing Unit (CPU) 2200, memory 2201, an external storage unit 2202 such as a hard disk, and a Network Interface Card (NIC) 2203 which are connected to each other by a bus. In the memory 2201, the relocation control section 101 and the database management section 103 are stored as programs, which are executed by the CPU 2200. The database 102 is stored in the external storage unit 2202. The NIC 2203 is connected to the network 130, being responsible for communication with the storage device 110 and the management client 120.

The storage device 110 includes a CPU 2210, memory 2211, a disk array 2212 which is an arrangement of a large number of storage units such as hard disks, a NIC 2213, and a Channel Adapter (CHA) 2214, which are connected to each other via a bus. In the memory 2211, the DKC 111 is stored as a program and executed by the CPU 2210. When the DKC 111 is executed, a storage area of the disk array 2212 is supplied as a volume to the host 132 which is connected to the storage device 100 via the CHA 2214 and the network 131. The NIC 2213 is connected to the network 130, being responsible for communication with the management server 100.

The management client 120 includes a CPU 2220, memory 2221, and a NIC 2223 which are connected to each other via a bus. In the memory 2221, the browser 121 is stored as a program, which is executed by the CPU 2220. The NIC 2223 exchanges various data and commands with the management server 100 by way of the network 130. Descriptions of the components 131 and 132 are omitted.

First Embodiment

Figure 3:
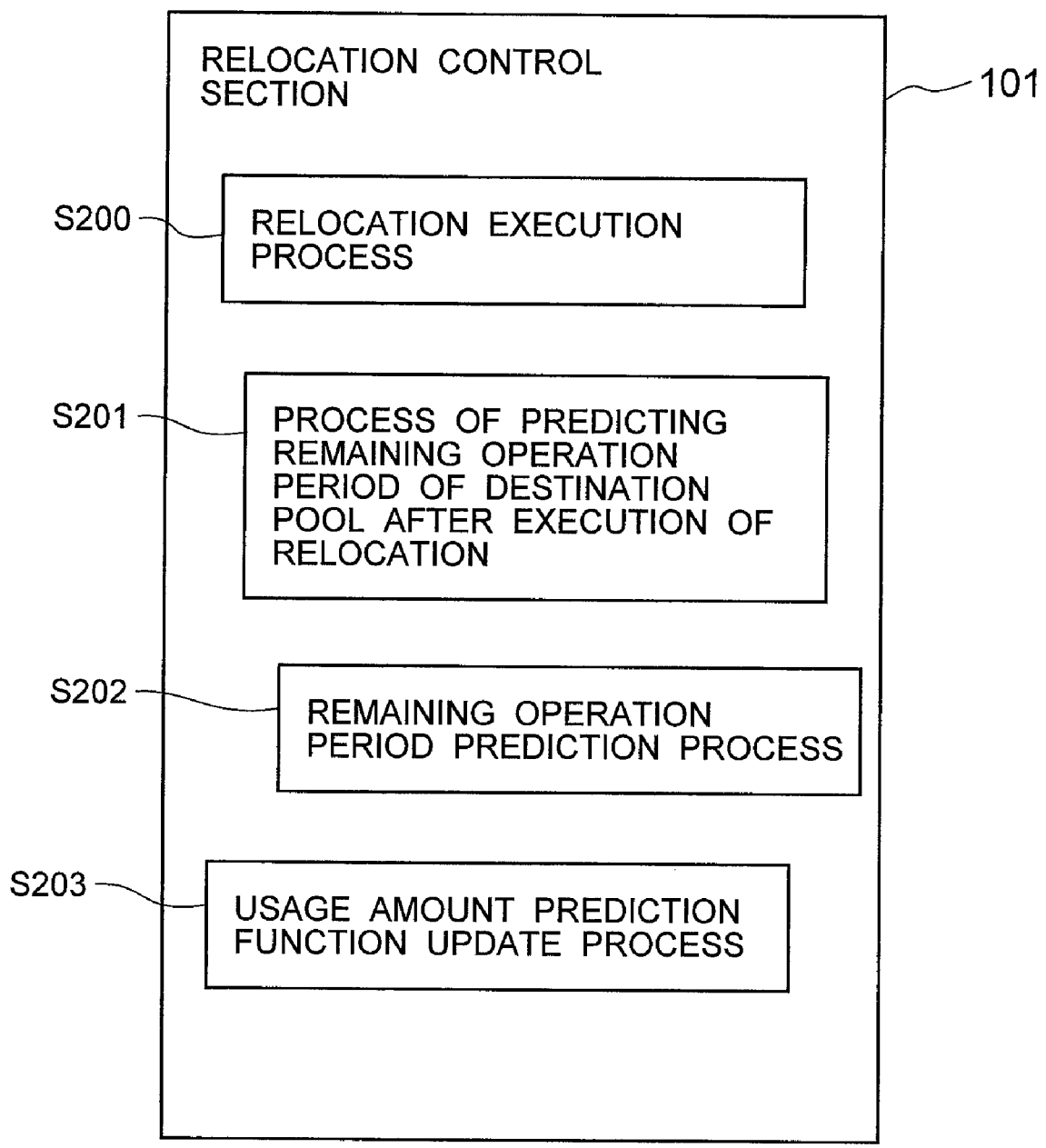
FIG. 3 shows the configuration of a relocation control section of according to a first embodiment.

FIG. 3 shows the configuration of the relocation control section according to a first embodiment. The relocation control section 101 consists of relocation execution process S200, process of estimating the remaining operation period of a destination pool after executing relocation S201, remaining operation period estimation process S202, and usage amount prediction function update process S203. Details on the processes will be shown below.

Figure 4:
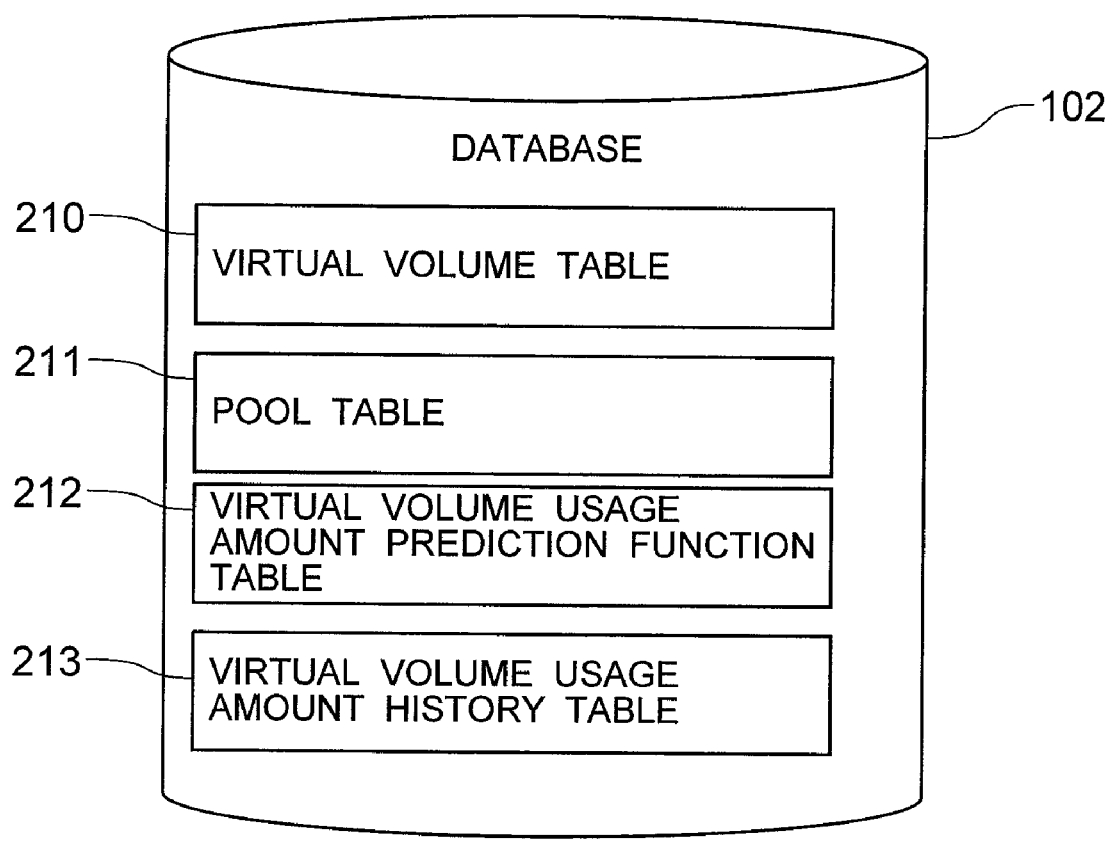
FIG. 4 shows the structure of a database according to the first embodiment.

FIG. 4 shows the structure of a database according to the first embodiment. The database 102 consists of a virtual volume table 210, a pool table 211, a virtual volume usage amount prediction function table 212, and a virtual volume usage amount history table 213.

The structures of these tables in the database 102 will be described below.

FIGS. 5A to 5D show the structures of the tables in the database shown in FIG. 4. The virtual volume table 210 is composed of collection of virtual volume records 300 that store attribute information of the virtual volumes 114 obtained from the DKC 111, as illustrated in FIG. 5A. Each of the records has, at least, a virtual volume ID field 301 which stores a virtual volume ID which is a value uniquely identifying a virtual volume 114 represented by that record, a pool ID field 302 which indicates a pool ID which is a value uniquely identifying a pool to which the virtual volume belongs, a virtual capacity field 303 which indicates the virtual capacity of the virtual volume as a value in megabytes, and an actual usage amount field 304 which indicates the total size of a physical storage area that is actually assigned to the virtual volume as a value in megabytes. Contents of the virtual volume table 210 and attribute information for the actual virtual volumes 114 are synchronized to each other by a known method such as obtaining information from the DKC 111 at certain time intervals. The virtual volume record 300 and the virtual volume usage amount prediction function record 320, which will be discussed later, have a one-to-one quantity relationship.

The pool table 211 is composed of collection of the pool records 310 that store attribute information of each of the pools 113 as illustrated in FIG. 5B. Each of the records has, at least, a pool ID field 311 which stores a pool ID which is a numerical value uniquely identifying a pool 113 represented by that record, a capacity field 312 which indicates the total capacity of the pool as a value in megabytes, an actual usage amount field 313 that indicates the actual usage amount of the pool as a value in megabytes, a page size field 314 which indicates a unit data size for assigning a physical storage area of the pool 113 to a virtual volume 114 in that pool as a value in kilobytes, a RAID type field 315 that indicates the RAID configuration type of a disk that implements the pool (e.g., RAID0, RAID1, RAID5), and a performance type field 316 that indicates the performance type of the disk that implements the pool (e.g., SATA, SCSI, FC). The contents of the pool table 211 and attribute information for the actual pools 113 are synchronized to each other by a known method such as obtaining information from DKC 111 at certain time intervals. SATA is an abbreviation of Serial Advanced Technology Attachment. SCSI is an abbreviation of Small Computer System Interface. FC is an abbreviation of Fibre Channel.

The virtual volume usage amount prediction function table 212 is composed of collection of the virtual volume usage amount prediction function records 320 that store a coefficient of a linear prediction function for calculating a predicted value of actual usage of each virtual volume 114, as illustrated in FIG. 5C. Each of the records has, at least, a virtual volume ID field 321 that stores the virtual volume ID of a virtual volume 114 for which an actual usage amount is predicted by the prediction function represented by that record, and a linear coefficient field 322 that stores an estimated value of increase in actual usage amount of the virtual volume 114 per day as a value in megabytes. A predicted value of actual usage amount of the virtual volume 114 at a certain point in future indicated by the virtual volume ID field 321 is determined by adding the product of the number of days from the point of prediction made at present and the value in the linear coefficient field 322 to the current actual usage amount of the virtual volume. For example, assuming that the actual usage amount at present is 750 MB and the linear coefficient is 50 MB/day for the virtual volume 114 which has a virtual volume ID of 0000, the predicted value of actual usage amount of this virtual volume three days later is determined to be 750+ 50×3=900 MB. The virtual volume record 300 and the virtual volume usage amount prediction function record 320 have a one-to-one relationship.

The virtual volume usage amount history table 213 is composed of collection of the virtual volume usage amount history records 330 that store actual usage amount of each virtual volume 114 per certain time period, e.g., per hour, as illustrated in FIG. 5D. Each of the records has, at least, a virtual volume ID field 331 which stores the virtual volume ID of a virtual volume 114 whose actual usage amount is indicated by that record, a time field 332 which indicates a date and time at which the actual usage amount was obtained, and an actual usage amount field 333 which indicates the actual usage amount of the virtual volume at that time as a value in megabytes.

Now, with reference to FIGS. 6, 7, 8, 9 and 10, description will be given of a method for a user to instruct relocation of a virtual volume to a pool and relocate the designated virtual volume.

Figure 6:
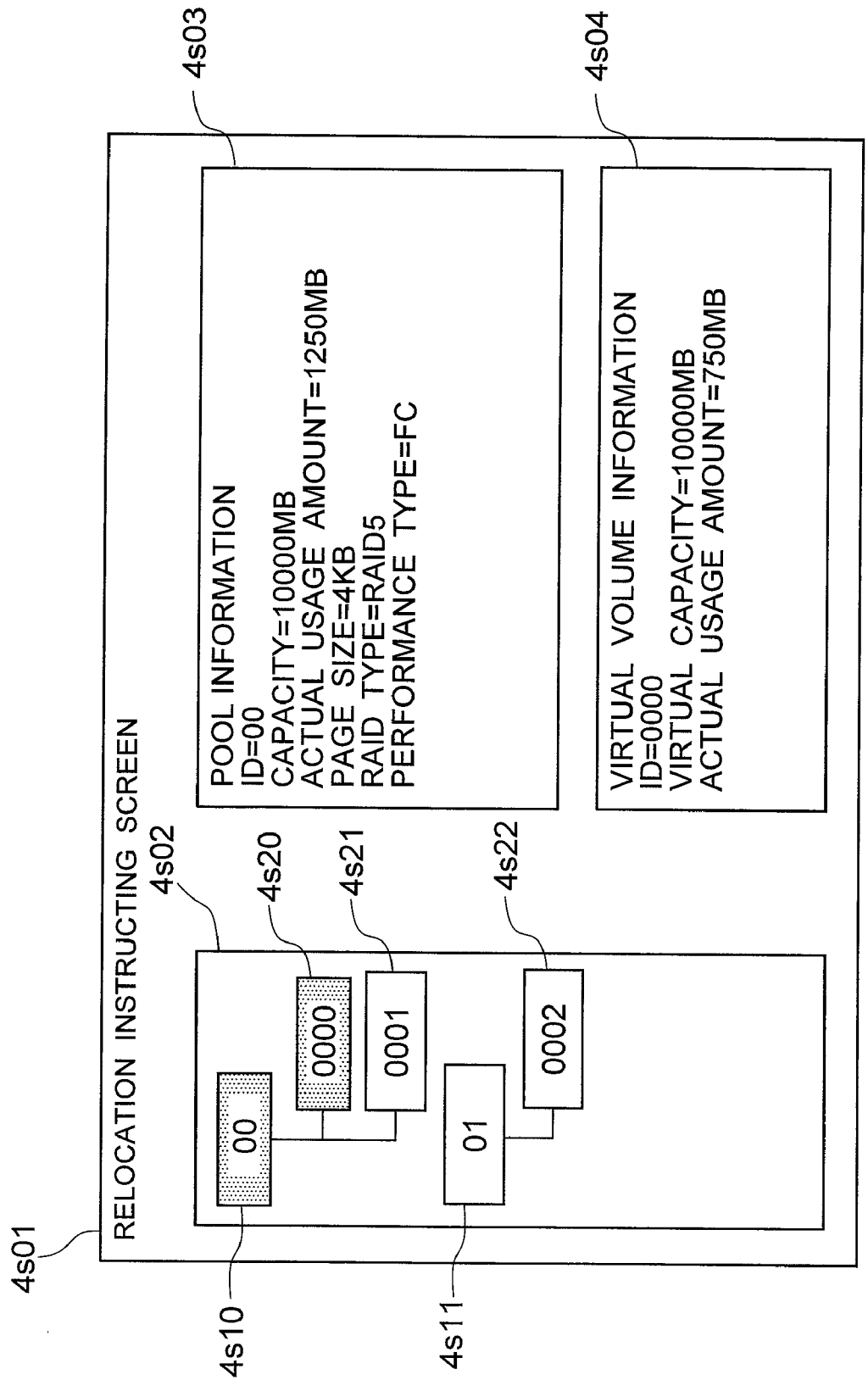
FIG. 6 illustrates a relocation instructing screen according to the first embodiment.

FIG. 6 shows a screen for instructing relocation according to the first embodiment. With reference to FIG. 6, description will be given of an operation method for a user to instruct relocation of a virtual volume to a destination pool and call the relocation execution process S200 (see FIGS. 3 and 7). A relocation instructing screen 4s01 is a screen that is displayed on the browser 121. The relocation instructing screen 4s01 includes a tree area 4s02, a pool information area 4s03, and a virtual volume information area 4s04. In the tree area 4s02, nodes representing pools and nodes representing virtual volumes are displayed as a tree. FIG. 6 illustrates that two pools are represented by nodes 4s10 and 4s11, virtual volumes that belong to the pool represented by the node 4s10 are represented by nodes 4s20 and 4s21, and a virtual volume that belongs to the pool represented by the node 4s11 is represented by a node 4s22. The pool IDs of the pools corresponding to the nodes 4a10 and 4s11 are 00 and 01, respectively, and the virtual volume IDs of virtual volumes corresponding to the nodes 4s20, 4s21 and 4s22 are 0000, 0001 and 0002, respectively.

The user can make one pool and one volume selected by clicking on a node in the tree area 4s02 using a mouse. Selected nodes are highlighted on the screen and attribute information for a pool and a virtual volume which are represented by those nodes is displayed in the pool information area 4s03 and the virtual volume information area 4s04, respectively. FIG. 6 shows that nodes 4s10 and 4s20 are selected.

The user further can instruct execution of relocation by dragging and dropping a node representing a virtual volume onto a node representing a pool in the tree area 4s02 using a mouse. For example, by dragging and dropping the node 4s20 onto the node 4s11, the user can instruct relocation of the virtual volume having a virtual volume ID of 0000 into the pool having a pool ID of 01. Thus, when the user gives an instruction on relocation on the relocation instructing screen 4s01 shown in FIG. 6, the relocation execution process S200 is executed as illustrated in FIG. 7.

Figure 7:
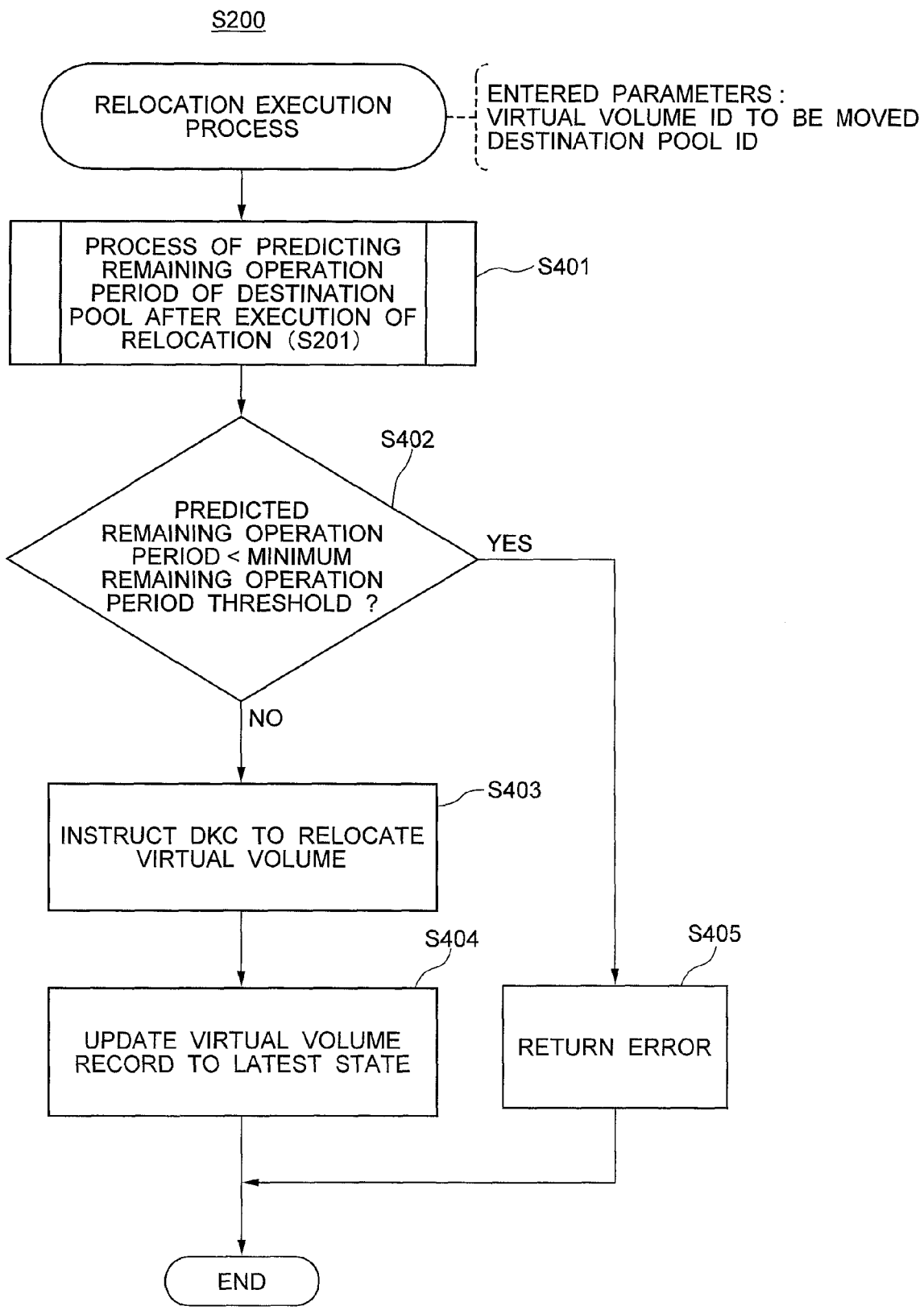
FIG. 7 is a flowchart illustrating a relocation execution process.

FIG. 7 is a flowchart illustrating the procedure of the relocation execution process. The relocation execution process S200 receives a virtual volume ID to be moved and a pool ID which is the destination as parameters and carries out relocation of the virtual volume. The relocation execution process S200 is called by the user instructing relocation of a virtual volume to a pool by the operation method described above via the browser 121. The relocation execution process S200 is executed by the CPU 2200.

At step S401, a virtual volume ID to be moved and a destination pool ID are passed to call the process S201 for predicting the remaining operation period of a destination pool after execution of relocation. At step S402, determination is made as to whether the remaining operation period obtained as a returned value at step S401 is smaller than a minimum remaining operation period threshold or not. The minimum remaining operation period threshold is a threshold value that represents a minimum time period before pool exhaustion that should be secured for a pool after relocation, and may be a fixed value defined by the system or a value that is determined from a parameter given by the user or a value in the database 102 by calculation. If the result of the determination is true (YES at step S402), the procedure proceeds to step S405, and if the result is false (No at step S402), the procedure proceeds to step S403.

At step S403, the virtual volume ID to be moved and the destination pool ID are designated to the DKC 111 to instruct relocation of the virtual volume to the different pool. The DKC 111 consequently relocates the physical storage area associated with the designated virtual volume to a general volume within the designated destination pool. At step S404, the latest attribute information for the moved virtual volume is retrieved from the DKC 111 and the virtual volume record 300 (see FIG. 5A) that corresponds to the moved virtual volume is updated. This updates the pool ID field 302 to a pool ID after the relocation. Then, the series of processes is terminated. At step S405, an error is returned to the caller to terminate the series of processes. The process S201 for predicting the remaining operation period of a destination pool after execution of relocation performed at step S401 will be described with FIG. 8.

Figure 8:
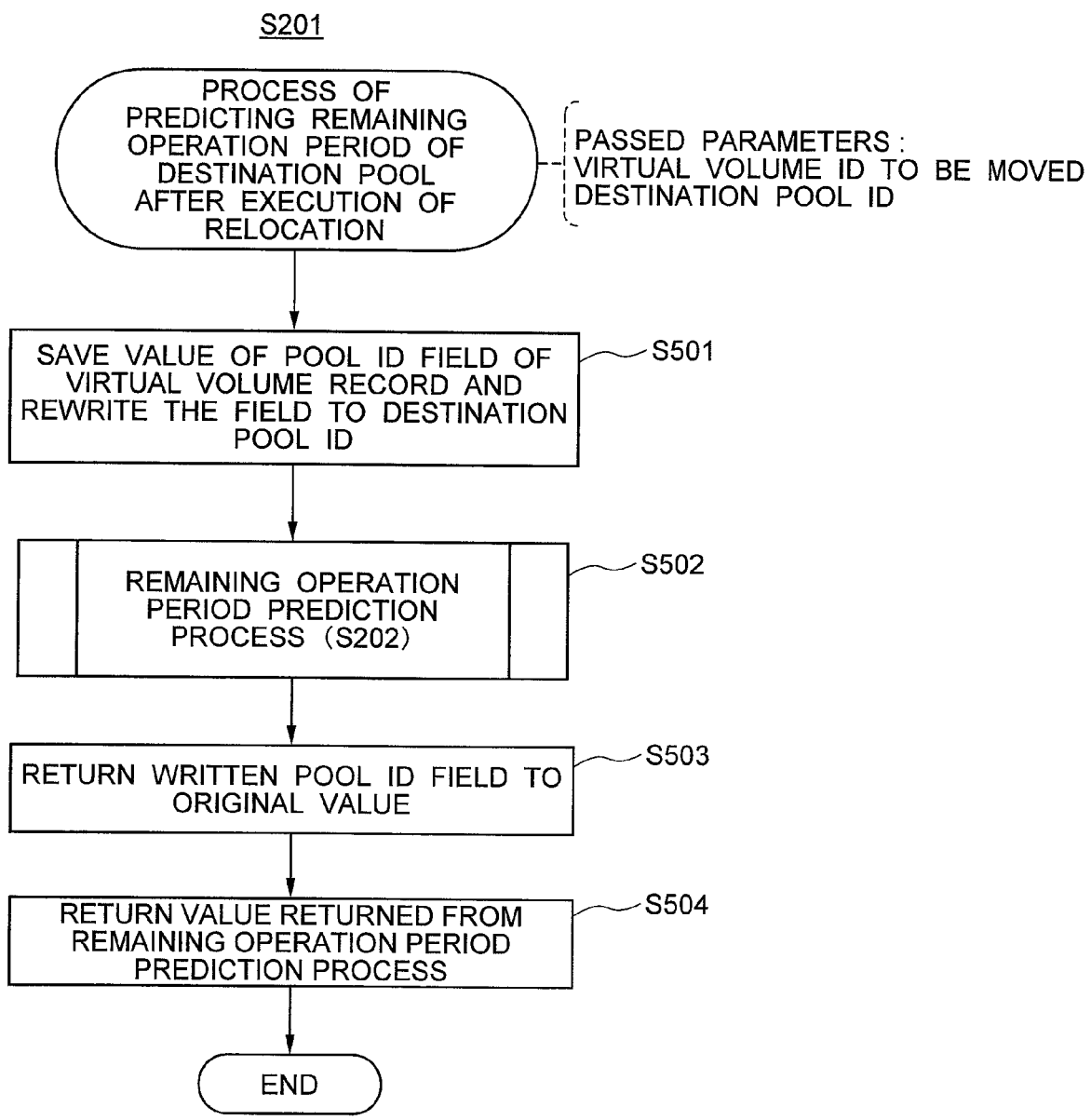
FIG. 8 is a flowchart illustrating a process of predicting the remaining operation period of a destination pool after relocation.

FIG. 8 is a flowchart illustrating the process of predicting the remaining operation period of a destination pool after execution of relocation. The process of predicting the remaining operation period of a destination pool after execution of relocation S201 receives a virtual volume ID to be moved and a pool ID which is the destination and predicts the remaining operation period of the destination pool on the assumption that the virtual volume to be moved is relocated to the destination pool. The process S201 of predicting the remaining operation period of a destination pool after execution of relocation is executed by the CPU 2200.

At step S501, a virtual volume record 300 that corresponds to the virtual volume ID to be moved is retrieved and the value in the pool ID field 302 of that record is saved, and then the pool ID field is rewritten to the destination pool ID. At step S502, the remaining operation period prediction process S202 is called by passing the destination pool ID. At step S503, the value in the pool ID field 302 which was rewritten at step S501 is reset to the saved value. At step S504, the result at step S502 is returned as a returned value and the series of processes is terminated. The remaining operation period prediction process S202 performed at step S502 will be described with FIG. 9.

Figure 9:
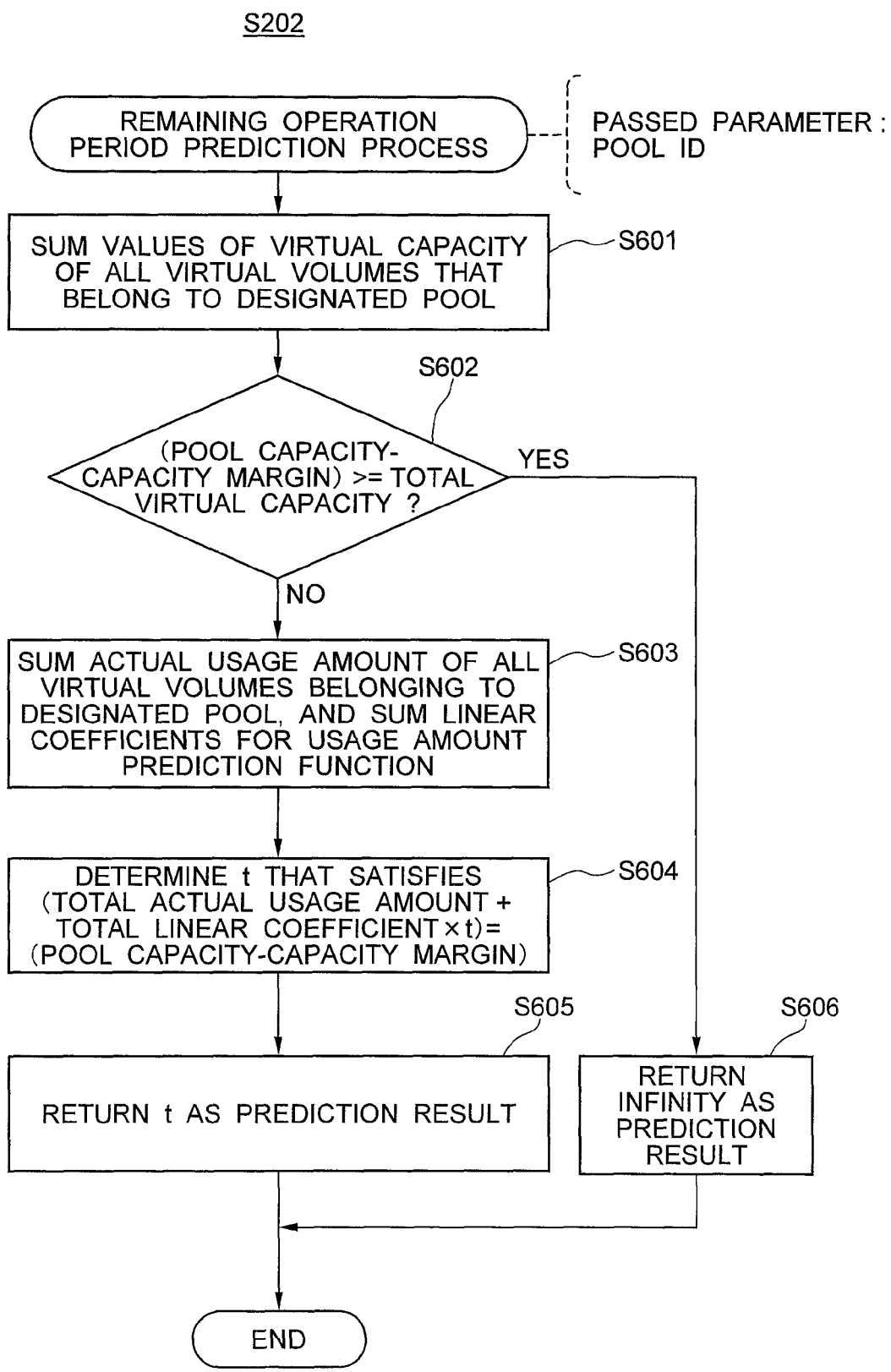
FIG. 9 is a flowchart illustrating a remaining operation period prediction process.

FIG. 9 is a flowchart illustrating the remaining operation period prediction process. The remaining operation period prediction process S202 receives a pool ID and predicts the remaining operation period of the pool. The remaining operation period prediction process S202 is executed by the CPU 2200.

At step S601, all records relating to virtual volumes that belong to the designated pool are retrieved from the virtual volume table 210 (see FIG. 5A) and values in the virtual capacity field 303 of those records are summed. At step S602, the pool capacity is retrieved from the capacity field 312 (see FIG. 5B) of the pool record 310 that corresponds to the designated pool and determination is made as to whether the difference calculated by subtracting a capacity margin from the pool capacity exceeds the total virtual capacity determined at step S601 or not. The capacity margin represents a minimum available capacity with which a pool is considered to be operable. It may be a fixed value or a value that is determined by calculation from a parameter given by the user or a value in a database, but it is 10% of pool capacity in this embodiment. If the result of the determination is true (YES at step S602), the procedure proceeds to step S606, and if the result is false (No at step S602), the procedure proceeds to step S603.

At step S603, all records relating to virtual volumes that belong to the designated pool are retrieved from the virtual volume usage amount prediction function table 212 (see FIG. 5C) and values in the linear coefficient field 322 of those records are summed. Similarly, all records relating to virtual volumes that belong to the designated pool are retrieved from the virtual volume table 210 (see FIG. 5A) and values in the actual usage amount field 304 of those records are summed. For example, if virtual volumes having virtual volume IDs of 0000 and 0001 belong to the pool having a pool ID of 00 as illustrated in FIGS. 5A to 5D, the total actual usage amount and the total linear coefficient for the pool are 1250 MB (the sum of 750 MB and 500 MB) and 56 MB/day (the sum of 50 MB/day and 6 MB/day), respectively.

At step S604, using the total linear coefficient and the total actual usage amount determined at step S603, t is determined that meets (total actual usage amount+total linear coefficient×t)=(pool capacity−capacity margin). For example, if virtual volumes with virtual volume IDs of 0000 and 0001 belong to the pool with a pool ID of 00 as illustrated in FIGS. 5A to 5D), t for the pool is determined to be 138.4 by calculating t that satisfies (1250+56×t)=(10000−(10000×0.10)). That is, it is predicted that this pool will be able to operate securely for about 138 days. At step S605, t determined at step S604 is returned as the prediction result. At step S606, infinity is returned as the prediction result because the pool will never run out.

Now, description will be given of how to determine the linear coefficient field 322 of the virtual volume usage amount prediction function table 212 (see FIG. 5C). One method is to use a parameter given by the user. The user estimates the amount of increase in actual usage per unit time for each virtual volume and stores it in the linear coefficient field 322. Another method is to provide the usage amount prediction function update process S203 that automatically calculates a linear coefficient from history of actual usage amount. The usage amount prediction function update process S203 will be described in detail with FIG. 10.

Figure 10:
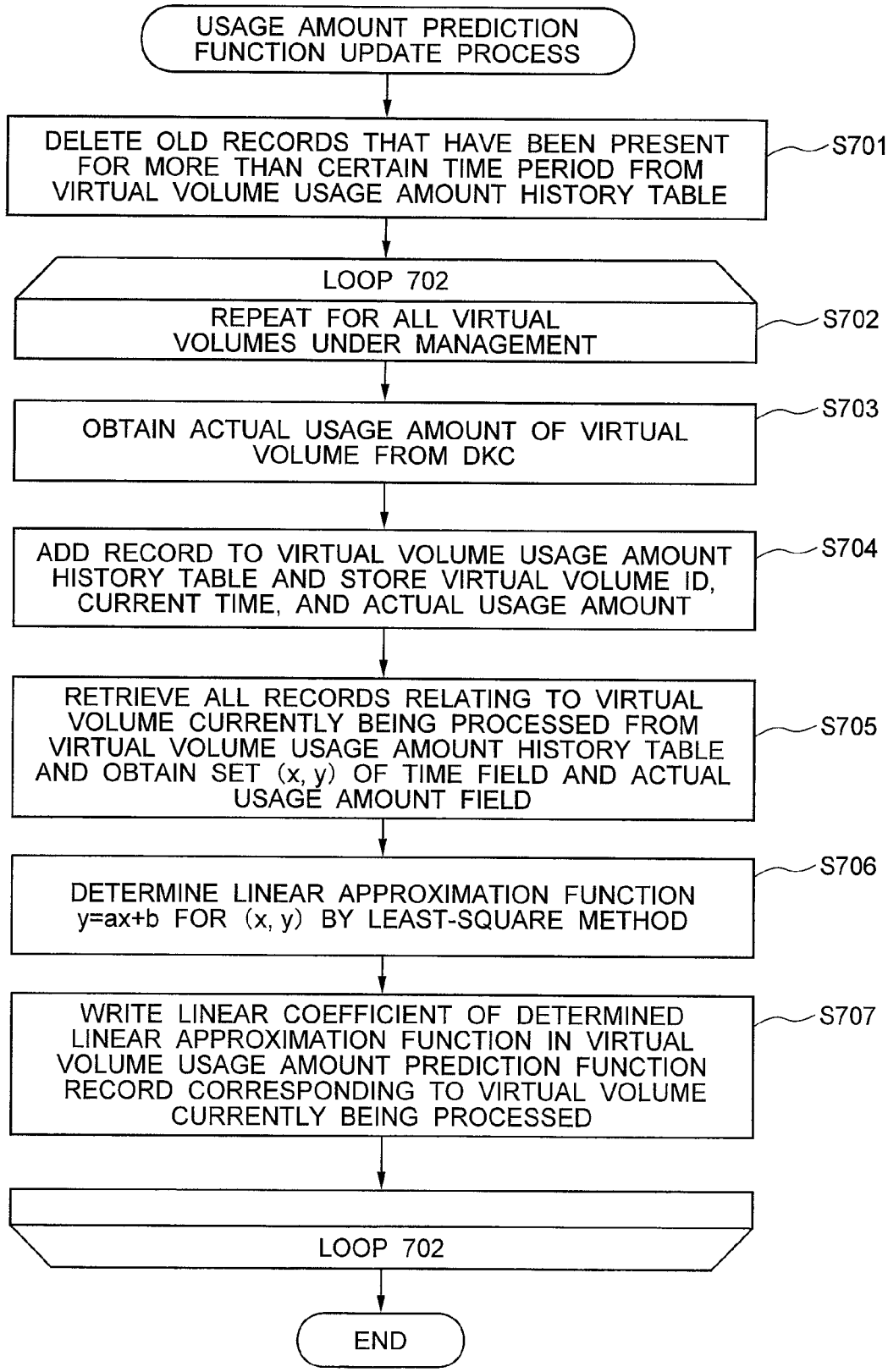
FIG. 10 is a flowchart illustrating a usage amount prediction function update process.

FIG. 10 is a flowchart illustrating the usage amount prediction function update process. The usage amount prediction function update process S203 is activated at certain time interval, e.g., at 00 minute every hour, and updates the virtual volume usage amount history table 213 (see FIG. 5D) based on the actual usage amount of virtual volumes at the time and also updates the virtual volume usage amount prediction function table 212 (see FIG. 5C). The usage amount prediction function update process S203 is executed by the CPU 2200.

At step S701, all records in which the difference between the time field 332 and the current time is larger than a certain reference value, that is, all records that are old, are deleted from the virtual volume usage amount history table 213 (see FIG. 5D). The reference value may be a fixed value or a value that is determined by calculation from a parameter given by a user or a value in the database 102. At step S702, steps S703 though S707 are repeated for all virtual volumes recorded in the virtual volume table 210.

At step S703, the actual usage amount of one of the virtual volumes are retrieved from the DKC 111. At step S704, a new record is added to the virtual volume usage amount history table 213, and the ID of the virtual volume, the current time, and the actual usage amount retrieved at step S703 are stored in the virtual volume ID field 331, time field 332, and actual usage amount field 333 of the record, respectively. At step S705, all virtual volume usage amount history records 330 that relate to the virtual volume are retrieved from the virtual volume usage amount history table 213 and a set of values (x, y) in the time field 332 and the actual usage amount field 333 is retrieved from all those records. At step S706, for each of the sets of (x, y) retrieved at step S705, the coefficient of a linear approximation function y=ax+b is determined by least-square method. At step S707, the linear coefficient a of the linear coefficient function determined at step S706 is written to the linear coefficient field 322 of each of the virtual volume usage amount prediction function records 320 that correspond to the virtual volume.

Although this embodiment uses a linear function that is determined from usage amount history of a virtual volume by least-square method as a prediction function, this does not limit the type of the prediction function and the way to determine the prediction function of the present invention. It is also possible to use a prediction function of a different type such as a general polynomial and an exponential function or adopt a different way of determining a prediction function.

Although the present embodiment is implemented as a system which is capable of relocating a single virtual volume, it is easy to extend it to a system capable of relocating a number of virtual volumes together.

As has been described, since this embodiment has the above-described configuration, it has advantages as follows. This embodiment predicts remaining operation periods of pools before and after relocation and controls relocation of a virtual volume based on the result of the prediction. Accordingly, the user can utilize storage resources securely and effectively through relocation of virtual volumes without having to pay attention to remaining operation period of pools by himself.

This embodiment determines whether relocation is possible or not based on prediction of the remaining operation period of a destination pool. Thus, it is not necessary for the user to pay attention to remaining operation periods of pools and determine whether the user may perform relocation by himself.

This embodiment permits relocation only when the predicted value of remaining operation period of a pool after relocation is equal to or larger than a threshold value that represents a minimum time period that should be secured. This can prevent the user from making remaining operation periods of pools too short as a result of relocation.

This embodiment predicts the remaining operation periods of pools before and after relocation using a prediction function that is determined based on parameters given by the user. Thus, the user can execute relocation that takes into consideration the remaining operation period of the pools just by presetting an estimate for each virtual volume.

This embodiment predicts remaining operation periods of pools before and after relocation using a prediction function that is determined based on history of actual usage amount of virtual volumes. Thus, the user can execute relocation that takes into consideration the remaining operation periods of the pools without having to make estimation by himself.

This embodiment predicts remaining operation periods of pools before and after relocation considering the nature of the actual usage amount of a virtual volume never exceeding its virtual capacity. Accordingly, it is possible to execute relocation making effective use of the nature of a virtual volume in thin provisioning.

Second Embodiment

A second embodiment of the present invention will be described. The second embodiment is a variation of the first embodiment. A characteristic of this embodiment is that pools are classified into tiers and a virtual volume can be relocated to a designated tier in consideration of remaining operation periods of the pools.

Figure 11:
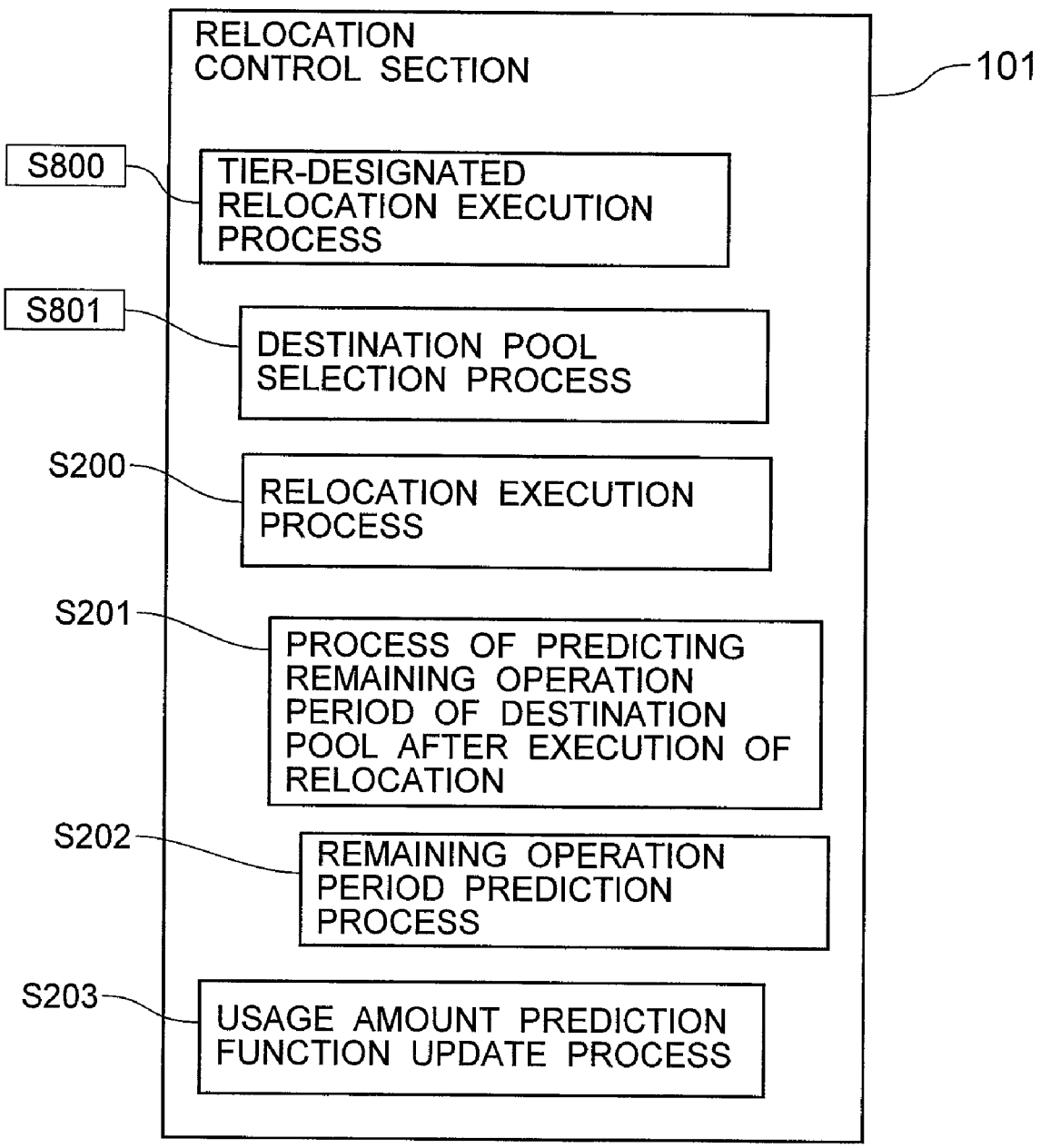
FIG. 11 shows the configuration of the relocation control section according to a second embodiment.

FIG. 11 shows the configuration of the relocation control section of the second embodiment. Components common to those shown in FIG. 3 are given the same reference numerals and descriptions of them are omitted. The relocation control section 101 includes a tier-designated relocation execution process S800 and a destination pool selection process S801 as additional modules. As illustrated in FIG. 11, these additional modules are shown with their reference numerals drawn in a box for easy distinction. This applies to embodiments discussed below.

Figure 12:
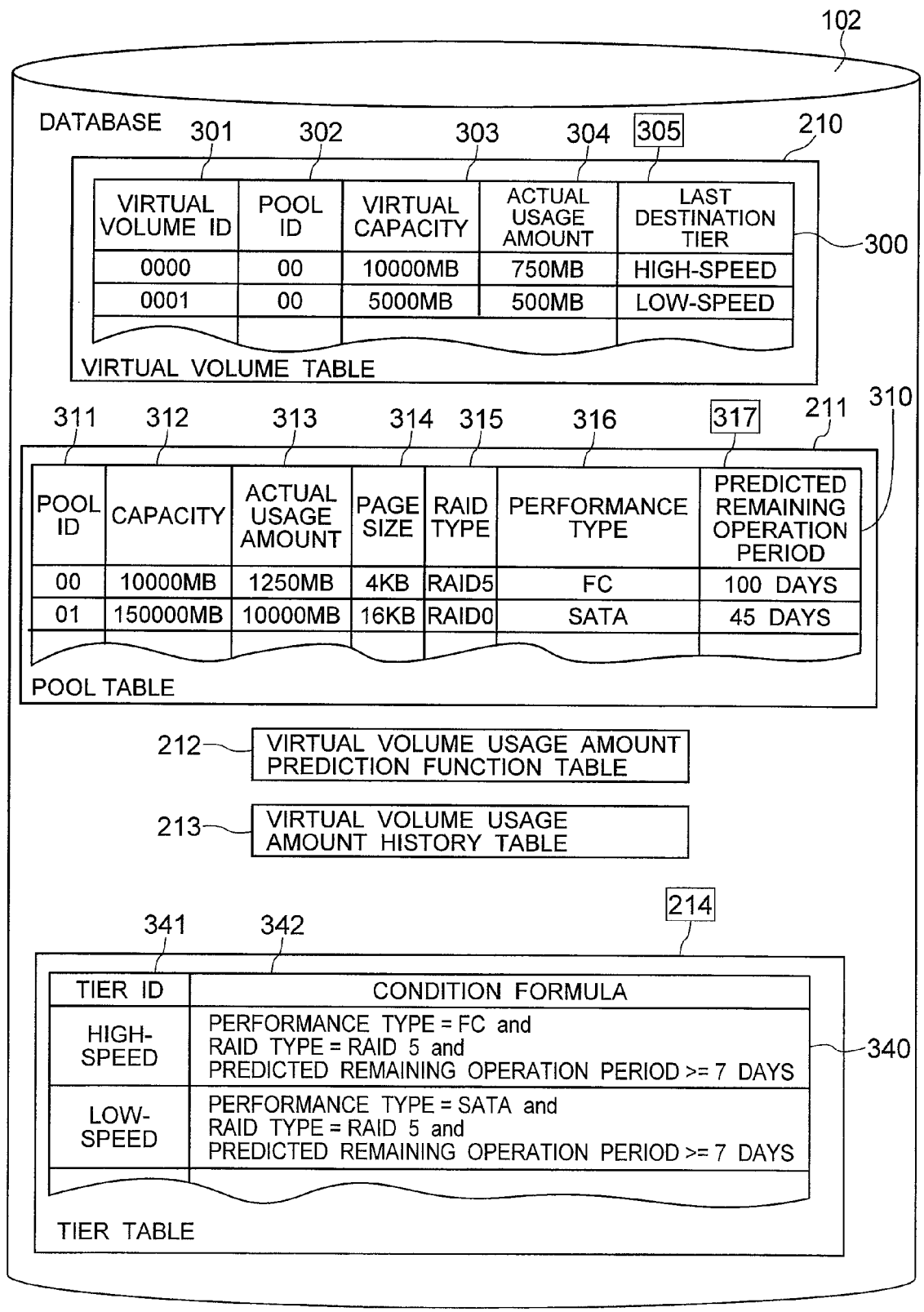
FIG. 12 shows the structure of a database according to the second embodiment.

FIG. 12 shows the structure of a database according to the second embodiment. Components common to those shown in FIGS. 4 and 5 are given the same reference numerals and descriptions of them are omitted. The database 102 has a tier table 214 as an additional table. The virtual volume table 210 has as an additional field a last destination tier field 305 which stores the tier ID of a destination tier to which the virtual volume was last relocated. The pool table 211 has, as an additional field, a predicted remaining operation period field 317 which temporarily stores a predicted value of a remaining operation period that is used when evaluating a tier condition (hereinafter referred to as "predicted remaining operation period").

The tier table 214 is a table which stores tier definitions set by a user for classifying pools into tiers, being composed of collection of tier records 340. The tier record 340 has, at least, a tier ID field 341 which stores a tier ID which is a name uniquely identifying a tier and a condition formula field 342 which indicates a tier condition which is a condition for selecting a pool that belongs to that tier. In the condition formula field 342, a tier condition is described as a condition formula for the fields of the pool record 310. For example, by describing a condition formula "RAID type=RAID5 and predicted remaining operation period≧seven days", it is possible to describe a tier condition for selecting a pool with the RAID type field 315 being RAID 5 and the predicted remaining operation period field 317 being seven or more days.

Now, with reference to FIGS. 13, 14, 15 and 16, description will be given of how a user instructs relocation of a virtual volume to a tier and relocate the designated virtual volume.

Figure 13:
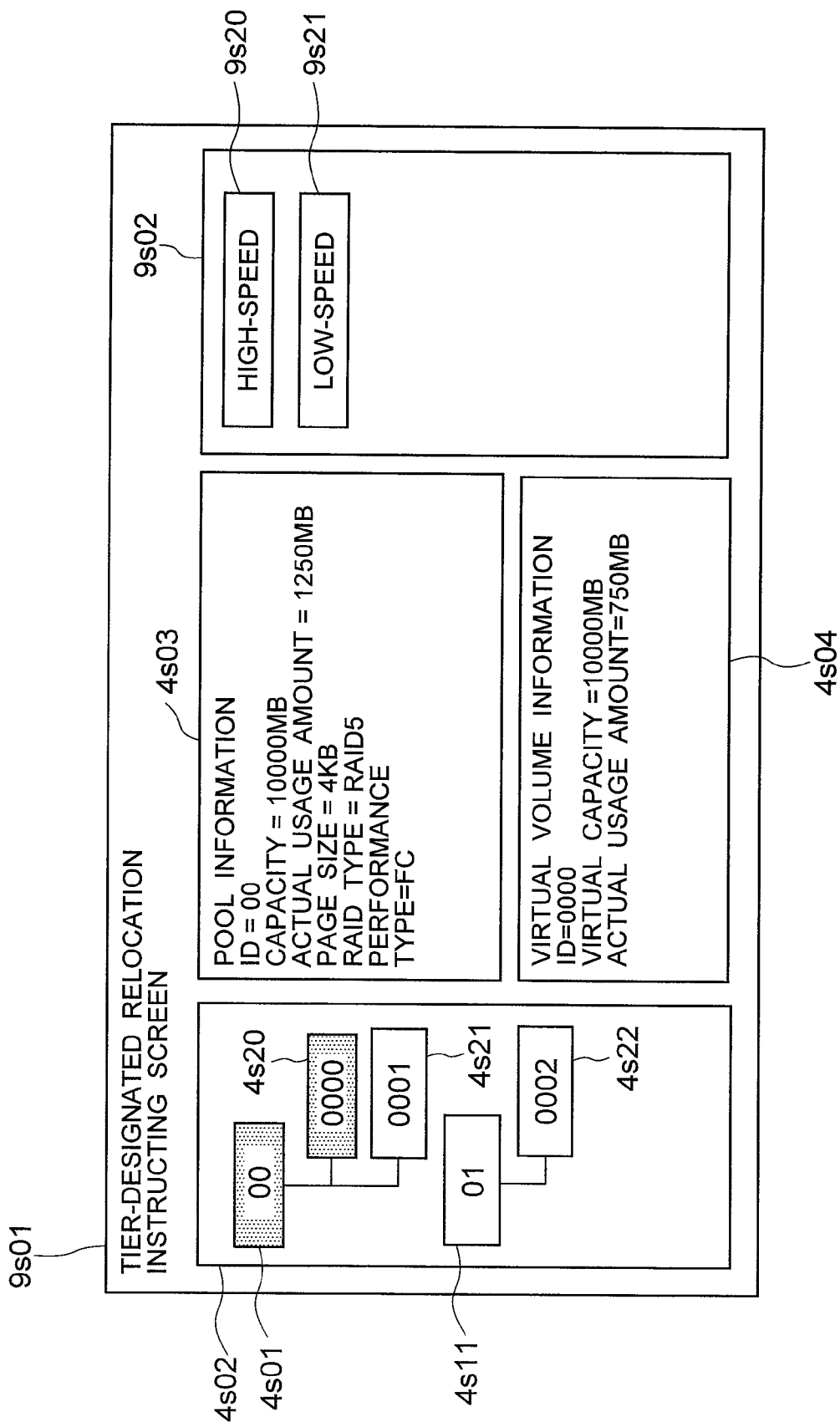
FIG. 13 illustrates a screen for instructing tier-designated relocation according to the second embodiment.

FIG. 13 illustrates a screen for instructing tier-designated relocation according to the second embodiment. With reference to FIG. 13, description will be given of an operation method for the user to instruct relocation of a virtual volume to a tier and call the tier-designated relocation execution process S800 (see FIG. 11). A tier-designated relocation instructing screen 9s01 includes a tree area 4s02, a pool information area 4s03, a virtual volume information area 4s04, and a tier designating area 9s02. The tree area 4s02, the pool information area 4s03, and the virtual volume information area 4s04 are the same as those described in the first embodiment (see FIG. 6). In the tier designating area 9s02, rectangles corresponding to tiers registered in the tier table 214 are displayed as a list table along with tier IDs. FIG. 13 illustrates that rectangles 9s20 and 9s21 are displayed that correspond to tiers that have tier IDs of "high-speed" and "low-speed", respectively.

The user can instruct relocation of a virtual volume to a tier by dragging and dropping a node that represents a virtual volume in the tree area 4s02 onto a rectangle in the tier specifying area 9s02 using a mouse. For example, by dragging and dropping the node 4s20 onto the rectangle 9s20, the user can instruct relocation of the virtual volume with a virtual volume ID of 0000 to the tier with a tier ID of "high-speed". When the user thus gives an instruction on relocation on the tier-designated relocation instructing screen 9s01 shown in FIG. 13, the tier-designated relocation execution process S800 shown in FIG. 14 is executed.

Figure 14:
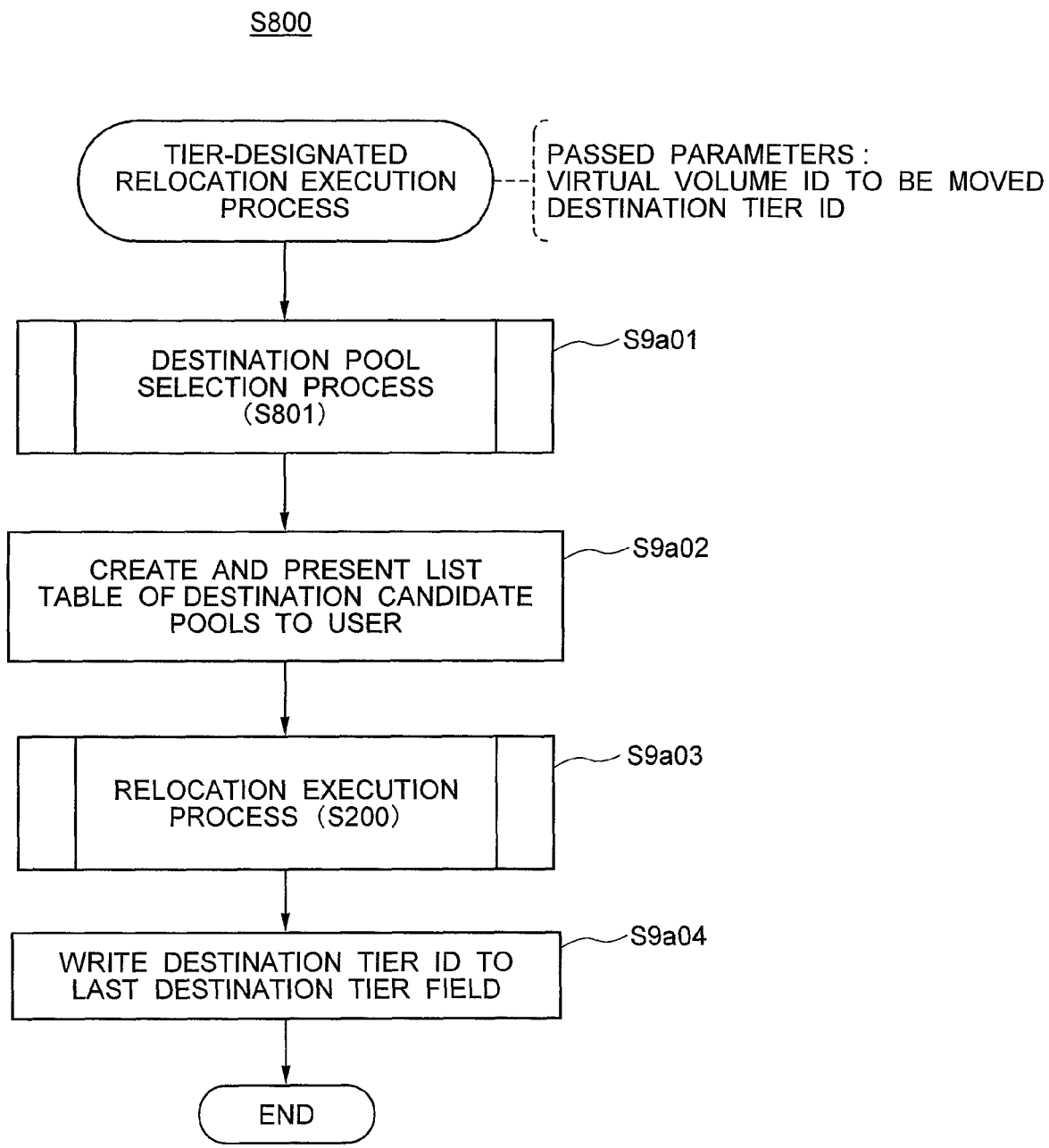
FIG. 14 is a flowchart illustrating a tier-designated relocation execution process.

FIG. 14 is a flowchart illustrating the tier-designated relocation execution process. The tier-designated relocation execution process S800 is called by the user instructing relocation of a virtual volume to a destination tier via the browser 121. The tier-designated relocation execution process S800 receives a virtual volume ID to be moved and a destination tier ID as parameters. The tier-designated relocation execution process S800 is executed by the CPU 2200.

Figure 15:
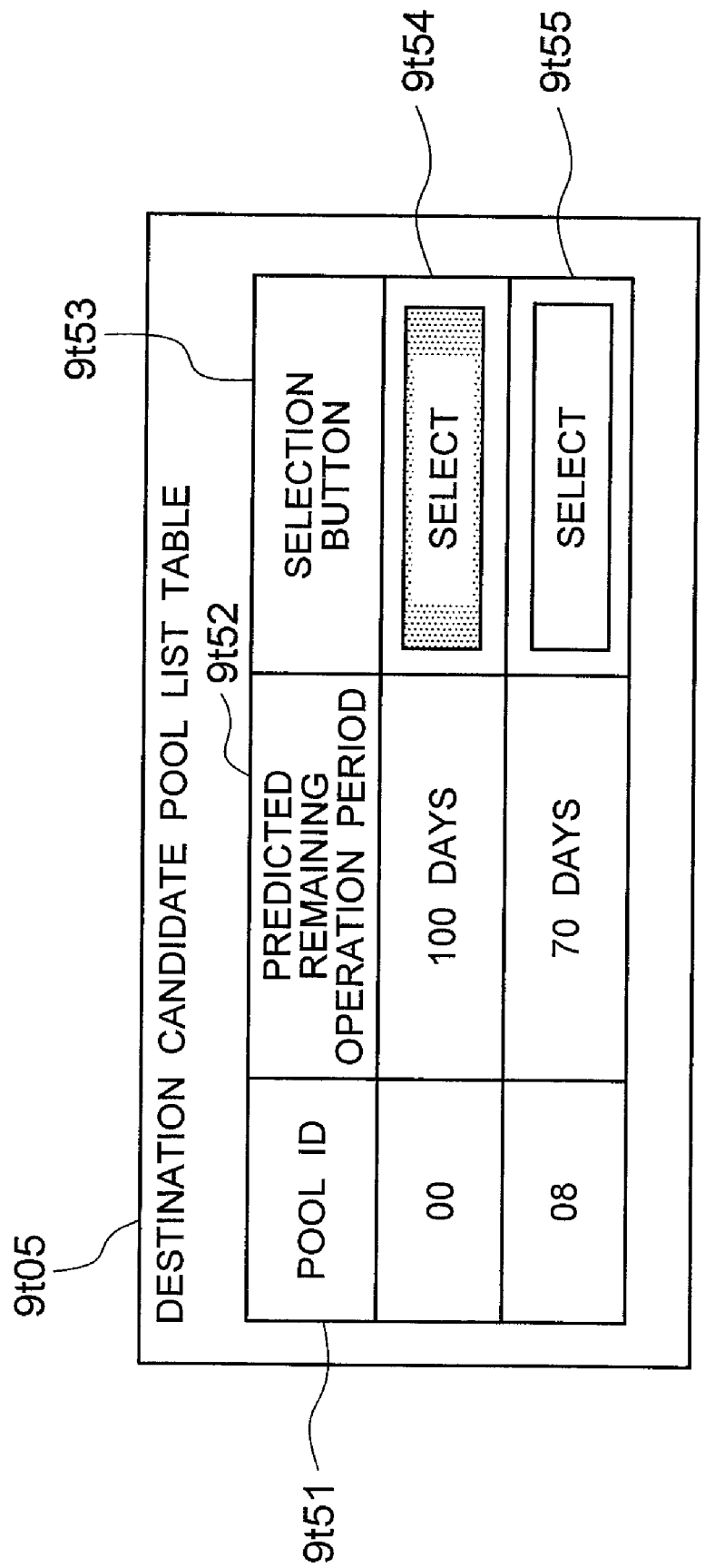
FIG. 15 illustrates an example of specific display of a list table of destination candidate pools.
Figure 16:
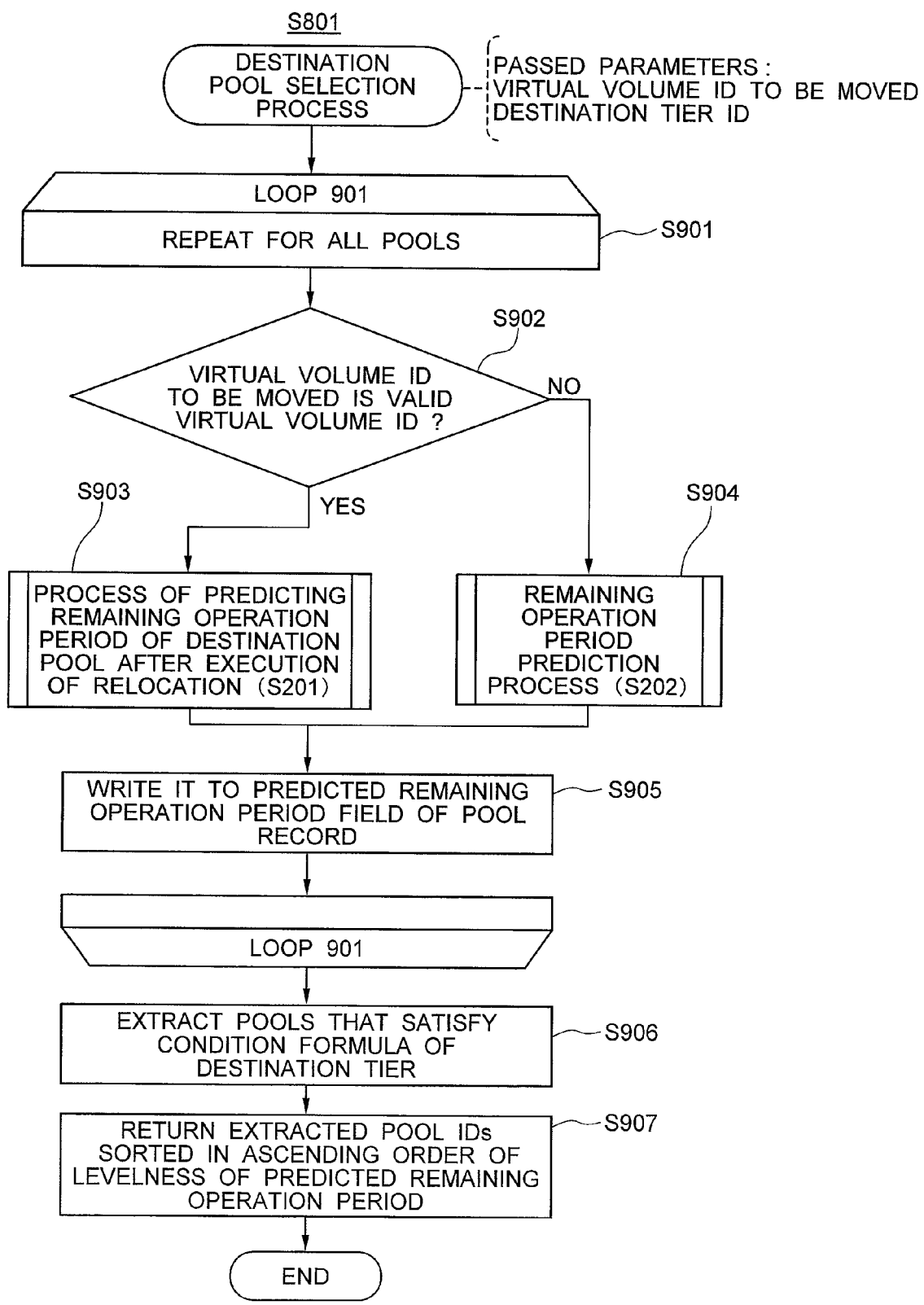
FIG. 16 is a flowchart illustrating a destination pool selection process.

At step S9a01, the virtual volume ID to be moved and the destination tier ID are passed to call the destination pool selection process S801 (see FIG. 16). At step S9a02, the list of pool IDs obtained at step S9a01 is used to create a list table of destination candidate pools (see FIG. 15) that contains attribute information for each of those pools and a selection button in each row, which is presented to the user via the browser 121 and the procedure waits for the user to press a selection button. Attribute information of a pool contained in a row includes, at least, the ID of the pool and its predicted remaining operation period after movement. The selection button provided in the first row of the list table is set as a default button.

FIG. 15 shows an example of specific display of the list table of destination candidate pools. The list table of destination candidate pools 9t05 includes a pool ID column 9t51, a predicted remaining operation period column 9t52, and a selection button column 9t53. A row 9t54 shows that the pool with a pool ID of 00 is the first candidate for destination and its predicted remaining operation period after execution of relocation is 100 days. A row 9t55 shows that the pool with a pool ID of 08 is the second destination candidate and its predicted remaining operation period after execution of relocation is 70 days. The user presses a selection button in the selection button column 9t53 to select a destination pool. The selection button in the first row 9t54 is selected as the default button as mentioned above so that user can select the pool as the first destination candidate through an operation of pressing Enter key, for example.

Referring to FIG. 14 again, at step S9a03, the virtual volume ID to be moved and the pool ID of the pool selected at step S9a02 are passed to call the relocation execution process S200 (see FIG. 7) and the virtual volume is moved to the selected pool. At step S9a04, the value of the destination tier (i.e., a tier ID) is written to the last destination tier field 305 of the virtual volume record 300 that corresponds to the virtual volume moved. As another embodiment, the first one of the pool ID list obtained at step S9a01 may be automatically selected instead of having the user select a pool at step S9a02.

FIG. 16 shows a flowchart that illustrates the destination pool selection process. The destination pool selection process S801 receives a virtual volume ID to be moved and a destination tier ID and calculates remaining operation periods of all the existing pools on the assumption that the virtual volume to be moved is moved to those pools. Then, the process S801 extracts pools that meet the tier condition for the destination tier and returns a list of those pool IDs that is sorted in ascending order of levelness of predicted remaining operation periods after relocation. When the process S801 receives a value that is invalid as a virtual volume ID to be moved, it calculates the predicted remaining operation period of each pool at present and then returns a list of pool IDs satisfying the destination tier condition that is sorted in ascending order of levelness of predicted remaining operation periods after relocation. The destination pool selection process S801 is executed by the CPU 2200.

At step S901, steps S902 through S905 are repeated for all pools that are present in the pool table 211 (see FIG. 12). At step S902, it is determined whether a virtual volume ID to be moved is valid or not. If the ID is valid (Yes at step S902), the procedure proceeds to step S903, and if it is invalid (No at step S902), the procedure proceeds to step S904. At step S903, the virtual volume ID to be moved and the pool IDs of the pools are passed to call the process S201 of predicting the remaining operation period of a destination pool after execution of relocation (see FIG. 8). At step S904, the pool IDs of the pools are passed to call the remaining operation period predicting process S202 (see FIG. 9).

At step S905, predicted remaining operation periods obtained at the previous step are written to the predicted remaining operation period field 317 (see FIG. 12) of the pool records 310 that correspond to the pools. At step S906, the pool table 211 (see FIG. 12) is searched in accordance with a condition formula stored in the condition formula field 342 of the tier record 340 that corresponds to the destination tier to extract pools that satisfy the condition. At step S907, the list of IDs of the pools extracted at the previous step is sorted in ascending order of levelness of predicted remaining operation periods after relocation, that is, in descending order of the value in the predicted remaining operation period field 317 of the pool record 310, and returned.

This embodiment has advantages as follows.

This embodiment is configured to have tier definitions for classifying pools into tiers and can include conditions on remaining operation period of pools in tier conditions for each tier. Further, evaluation of the tier conditions is performed based on predicted remaining operation periods of pools after relocation. Thus, the user can secure the remaining operation periods of the pools by means of the tier conditions and can select a pool that is appropriate for a tier based on accurate prediction that is made assuming relocation.

When there are a plurality of destination candidate pools in the same tier, this embodiment is configured to select a destination candidate pool as a more appropriate destination pool that provides high levelness of predicted remaining operation periods. Thus, the user can implement tiered storage management that maximizes security against pool exhaustion just by selecting a destination from a list of destination candidate pools that is sorted in the order of appropriateness on a screen, or automatically.

Third Embodiment

A third embodiment of the present invention will be described. The third embodiment is a variation of the second embodiment. A characteristic of this embodiment is that it decides a relocation plan for relocating a virtual volume within the same tier in order to level remaining operation periods of pools in the same tier.

Figure 17A:
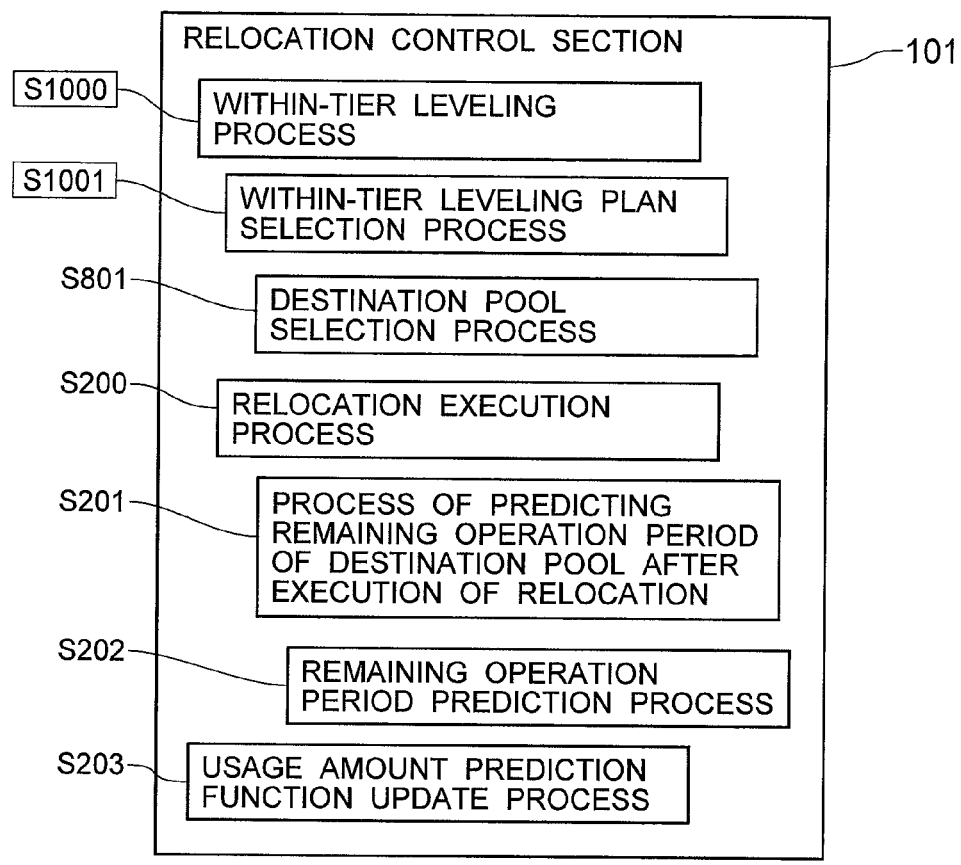
FIG. 17A shows the configuration of the relocation control section according to a third embodiment.
Figure 17B:
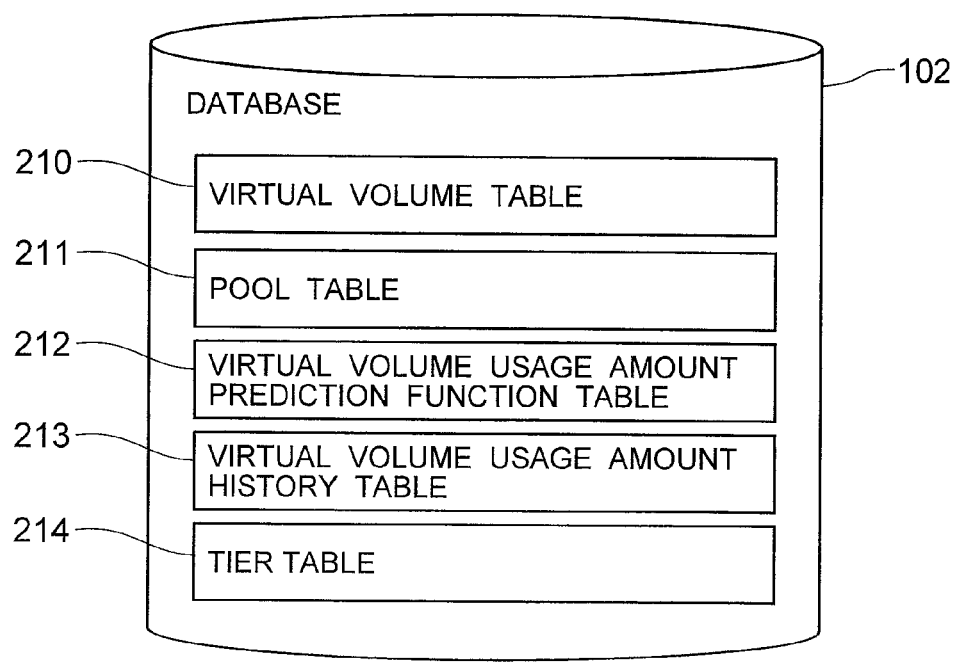
FIG. 17B shows the structure of a database according to the third embodiment.

FIG. 17A shows the configuration of the relocation control section according to the third embodiment and FIG. 17B shows the structure of a database according to the third embodiment. Components common to those shown in FIGS. 11 and 12 are given the same reference numerals and descriptions of them are omitted. The relocation control section 101 deletes the tier-designated relocation execution process S800 (see FIG. 11) and includes a within-tier leveling process S1000 and a within-tier leveling plan selection process S1001 as additional modules. The database 102 is the same as that of the second embodiment.

Figure 18:
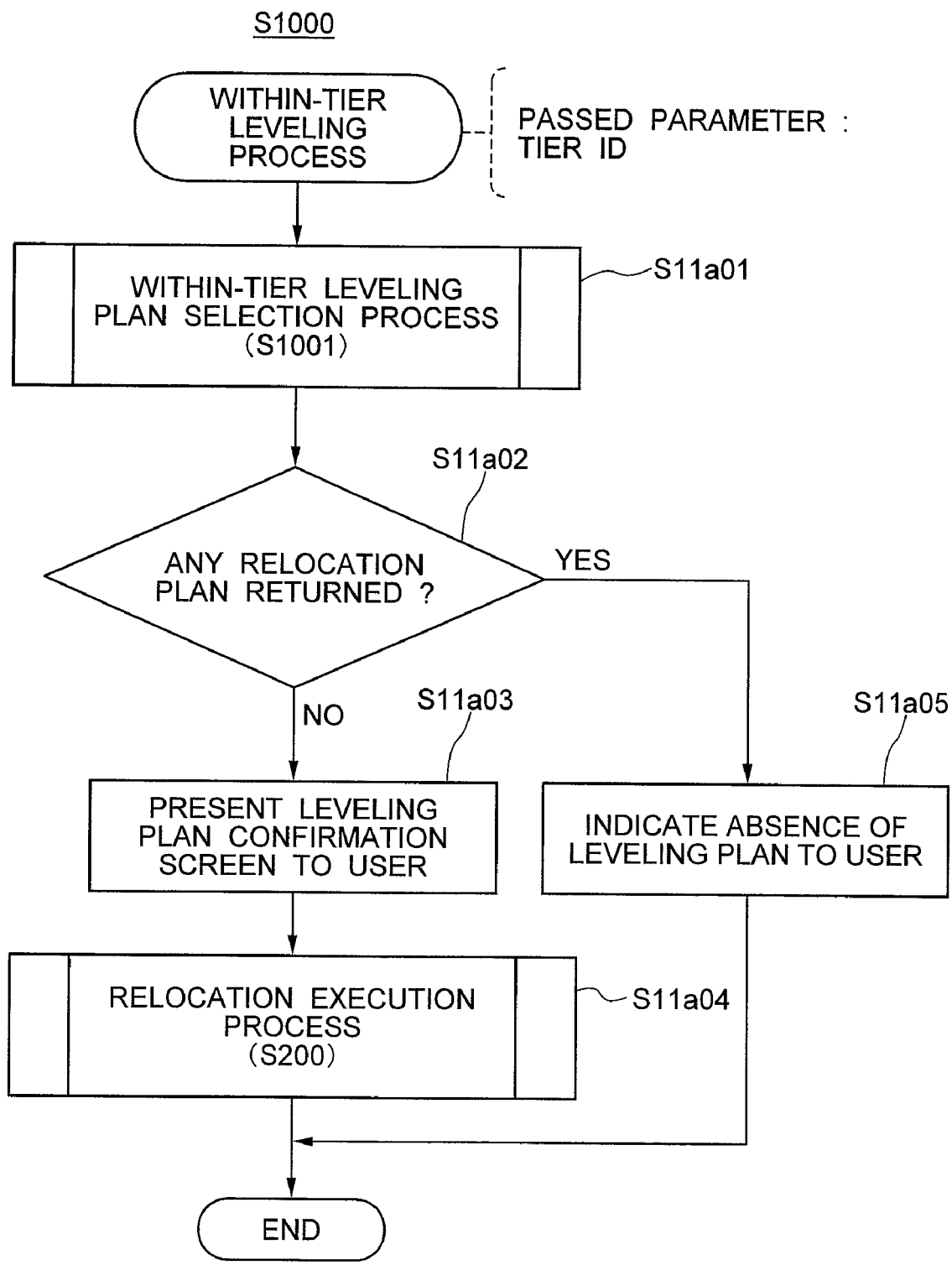
FIG. 18 is a flowchart illustrating a within-tier leveling process.

FIG. 18 is a flowchart illustrating the within-tier leveling process. The within-tier leveling process S1000 is called by the user instructing leveling of a tier via the browser 121. Alternatively, the process S1000 may be automatically activated in response to some trigger. The within-tier leveling process S1000 receives a tier ID to be leveled as a parameter. The within-tier leveling process S1000 is executed by the CPU 2200.

Figure 20:
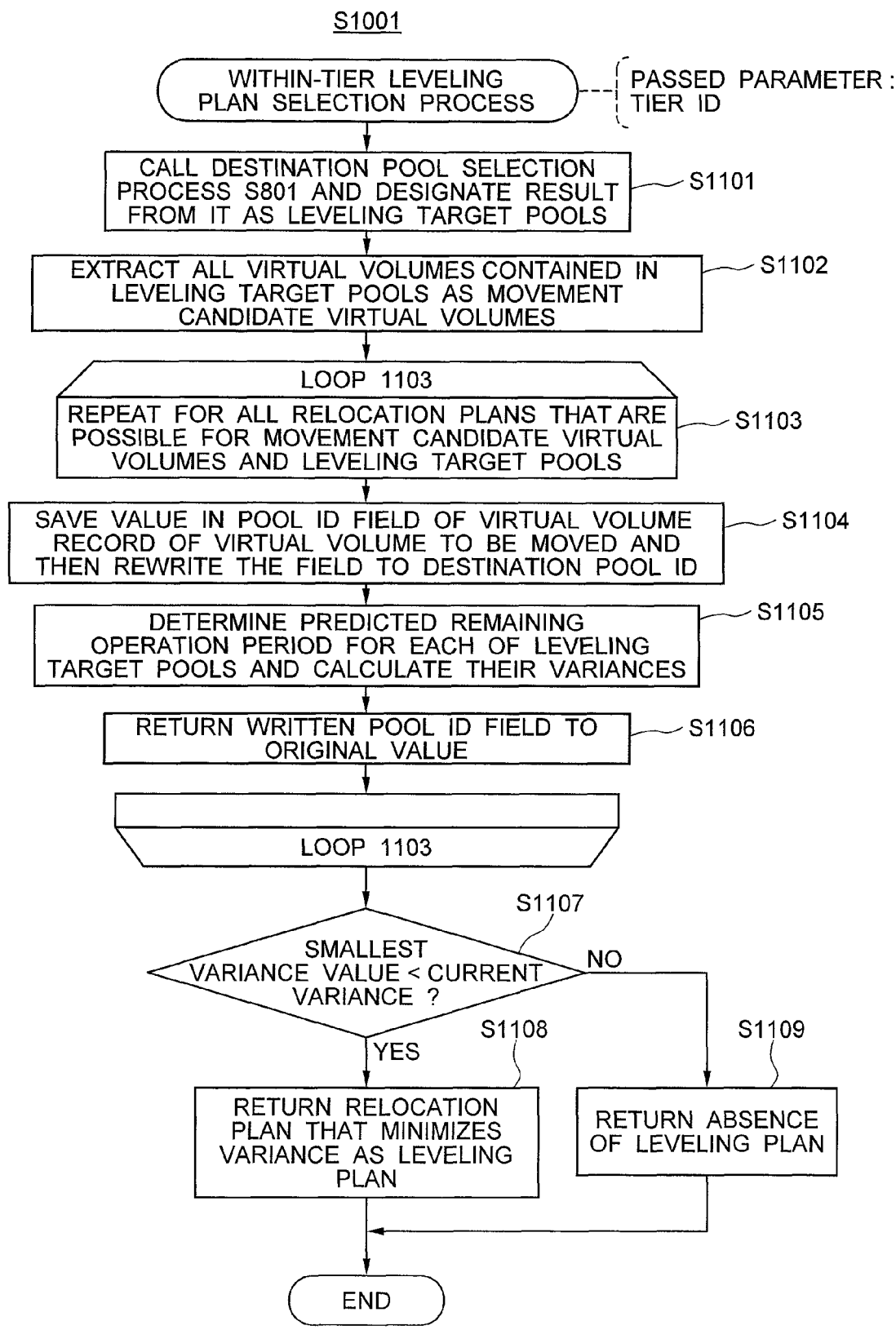
FIG. 20 is a flowchart illustrating a within-tier leveling plan selection process.

At step S11a01, a tier ID to be leveled is passed to call the within-tier leveling plan selection process S1001 (see FIG. 20). At step S11a02, it is determined whether a valid leveling plan which is a set of a virtual volume ID and a destination pool ID has been returned as the result of step S11a01. If a valid leveling plan has been returned (Yes at step S11a02), the procedure proceeds to step S11a03, and if absence of a leveling plan has been returned (No at step S11a02), the procedure proceeds to step S11a05.

At step S11a03, a screen for confirming a leveling plan 11s01 is presented to the user as illustrated in FIG. 19.

FIG. 19 shows an example of specific display of a leveling plan confirmation screen. The leveling plan confirmation screen 11s01 includes an area 11s02 in which a virtual ID to be moved is displayed, areas 11s11, 11s12 and 11s13 which display the pool ID of a source pool and predicted remaining operation period of the pool before and after relocation, respectively, as well as areas 11s21, 11s22, and 11s23 which display the pool ID of a destination pool and predicted remaining operation period of the pool before and after relocation, respectively. The leveling plan confirmation screen 11s01 also includes an OK button 11s31 and a cancel button 11s32 as well as various labels for explaining the meaning of display to the user. If the user presses the OK button 11s31, the procedure proceeds to step S11a04, and if the user presses the cancel button 11s32, the process is terminated immediately.

Referring to FIG. 18 again, at step S11a04, the relocation execution process S200 (see FIG. 7) is called to move the virtual volume that is designated by the relocation plan returned at step S11a01 to the destination pool, and the series of processes is terminated. At step S11a05, it is indicated to the user that a valid leveling plan does not exist, that is, levelness is already is highest, and the series of processes is terminated. With FIG. 20, description will be given of the within-tier leveling plan selection process S1001 for a leveling target that is performed at step 11a01.

FIG. 20 is a flowchart illustrating the within-tier leveling plan selection process. The within-tier leveling plan selection process S1001 returns a relocation plan that relocates a virtual volume within a designated tier to thereby make predicted remaining operation periods of pools within the tier more leveled than at present (hereinafter referred to as "leveling plan"). When such a relocation plan does not exist, absence of relocation plan is returned. The within-tier leveling plan selection process S1001 receives a tier ID to be leveled as a parameter.

At step S1101, an invalid virtual volume ID and the tier ID to be leveled are passed to call the destination pool selection process S801 (see FIG. 16) and a list of extracted pools is designated as leveling target pools. At step S1102, the virtual volume table 210 (see FIGS. 12 and 17) is searched to extract all virtual volumes that belong to the leveling target pools and they are designated as movement candidate virtual volumes.

At step S1103, steps S1104 through 1106 are repeated for all possible relocation plans that are sets of a virtual volume to be moved and a destination pool. A possible relocation plan can be obtained by designating any one of movement candidate virtual volumes as a virtual volume to be moved and designating any one of leveling target pools except for the pool to which the virtual volume to be moved belongs as a destination pool. At step S1104, the value in the pool ID field 302 (see FIG. 12) of the virtual volume record 300 that corresponds to the virtual volume to be moved is saved and the field is rewritten to the pool ID of the destination pool. At step S1105, the remaining operation period prediction process S202 (see FIG. 9) is called to determine the predicted remaining operation periods of the leveling target pools and their variances. At step S1106, the value in the pool ID field 302 that was rewritten at step S1104 is returned to the original value.

At step S1107, the same processing as at step S1105 is performed to determine a variance at the present time and it is determined whether the variance is larger than the smallest variance that was determined at step S1105. If the result of the determination is true (Yes at step S1107), the procedure proceeds to step S1108, and if the result is false (No at step S1107), the procedure proceeds to step S1109. At step S1108, a relocation plan that has the smallest variance is returned as a leveling plan. At step S1109, absence of a leveling plan is returned.

For example, assume that a pool A having a capacity of 10000 MB and a pool B having a capacity of 20000 MB exist in one tier and there are two virtual volumes in the pool A and one in the pool B. Assume further that all the virtual volumes have the same actual usage amount and rate of increase: the actual usage amount is 500 MB and the rate of increase is 50 MB/day. When the within-tier leveling process S1000 (FIG. 18) is executed to the tier, a relocation plan that relocates one of the virtual volumes in the pool A to the pool B is selected, and a leveling plan confirmation screen with the contents shown in FIG. 19 is displayed.

For selection of a leveling plan, any optimization algorithm can be used other than the one illustrated herein. In addition, although a relocation plan includes only movement of a single virtual volume in this embodiment, it is easy to extend it to include movement of a number of virtual volumes.

As has been described, this embodiment is configured to determine a relocation plan (or a set of a virtual volume to be moved and a destination pool) that is effective for leveling remaining operation periods of pools within one tier. Thus, the user can easily carry out relocation in order to enhance security against exhaustion of pools.

Fourth Embodiment

A fourth embodiment of the present invention will be described. The fourth embodiment is a variation of the second embodiment. A characteristic of this embodiment is that it predicts change of trend in usage amount increase before and after relocation based on differences of characteristics among tiers and corrects prediction of remaining operation periods after relocation when relocating a virtual volume between tiers.

Figure 21:
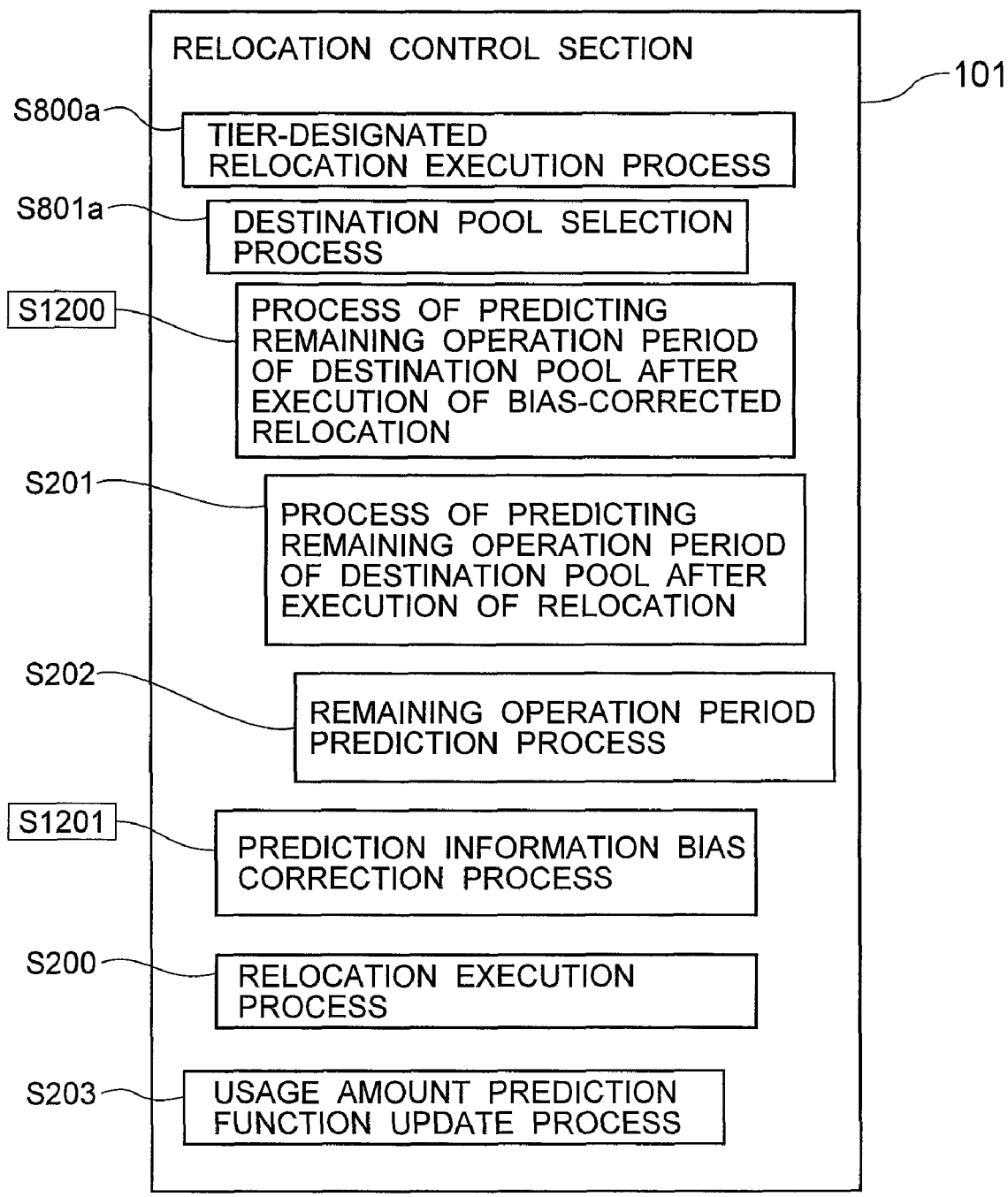
FIG. 21 shows the configuration of the relocation control section according to a fourth embodiment.

FIG. 21 shows the configuration of the relocation control section according to the fourth embodiment. Components common to those shown in FIG. 11 are given the same reference numerals and descriptions of them are omitted. The relocation control section 101 includes as additional modules a process S1200 of predicting the remaining operation period of a destination pool after execution of bias-corrected relocation and a prediction information bias correction process S1201. The relocation control section 101 also has a tier-designated relocation execution process S800a and a destination pool selection process S801a which are variations of the tier-designated relocation execution process S800 and the destination pool selection process S801 of the second embodiment.

Figure 22:
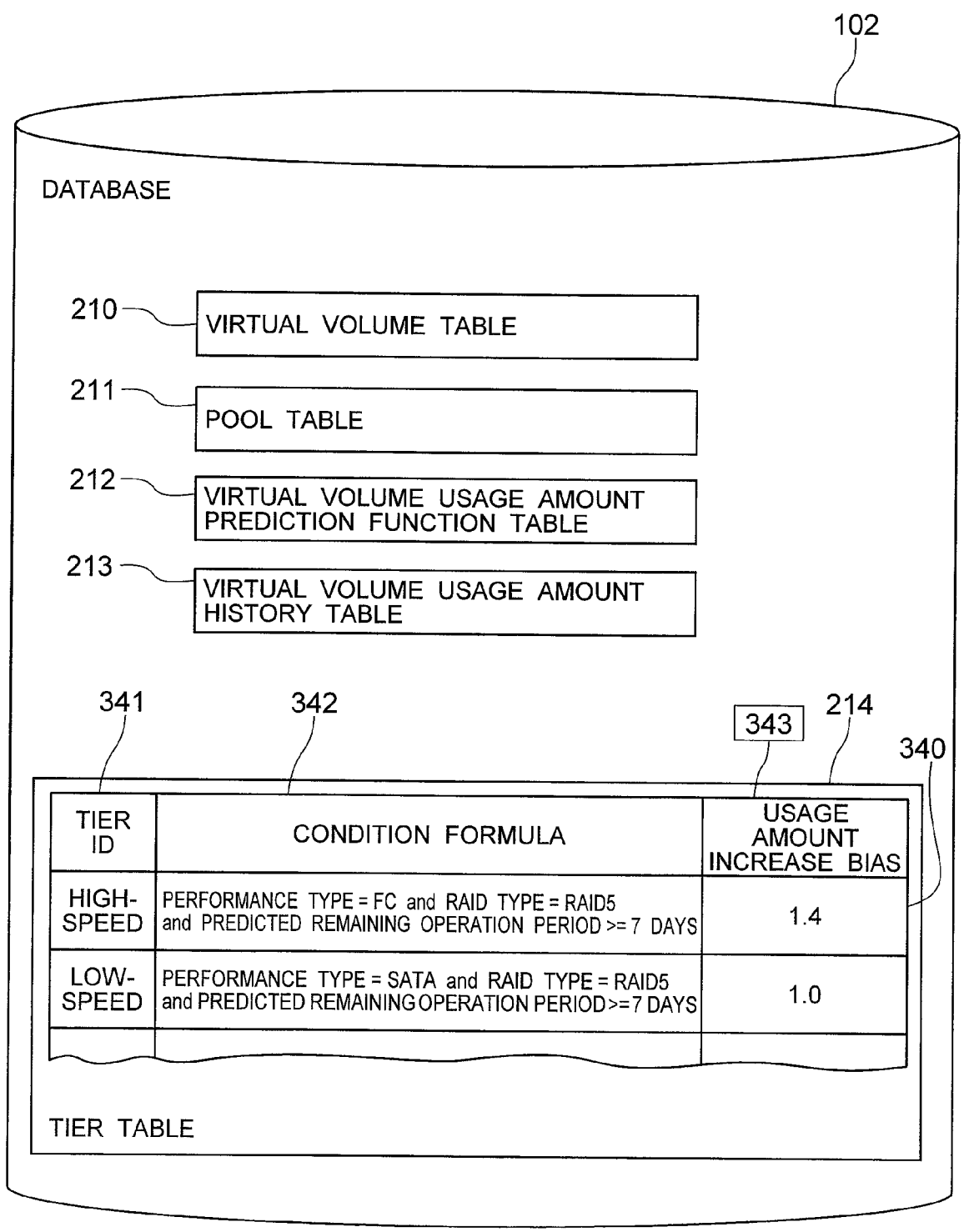
FIG. 22 shows the structure of a database according to the fourth embodiment.

FIG. 22 shows the structure of a database according to the fourth embodiment. Components common to those shown in FIG. 12 are given the same reference numerals and descriptions of them are omitted. The tier table 214 has a usage amount increase bias field 343 as an additional field.

The usage amount increase bias field 343 is a value that represents a trend in usage increase of a tier as a relative ratio among tiers. That is, a large value is set for a tier that is used for an application that frequently performs read/write and thus is likely to increase the usage amount and a small value is set for a tier that is used for an application that performs write accesses infrequently. Setting of a value in the usage amount increase bias field 343 may be done by a user in a similar way to the condition formula field 342, or if a performance type is designated as a condition in the condition formula field 342, a value may be automatically set in accordance with the performance type (i.e., a large value for a high-speed performance type and a small value for a low-speed performance type).

Figure 23:
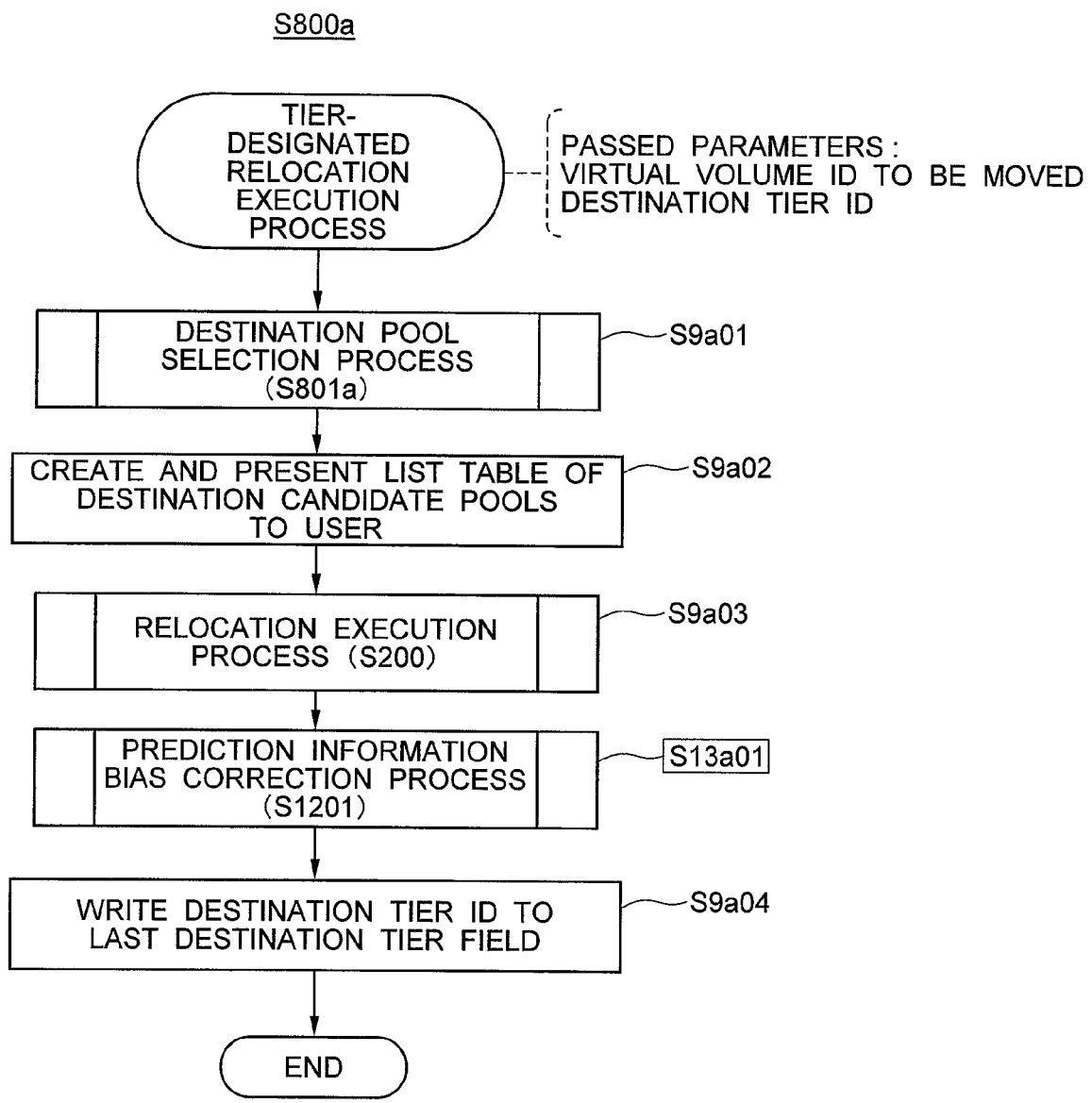
FIG. 23 is a flowchart illustrating the tier-designated relocation execution process according to the fourth embodiment.

FIG. 23 is a flowchart illustrating the tier-designated relocation execution process in the fourth embodiment. The tier-designated relocation execution process S800a adds one step to the tier-designated relocation execution process S800 (see FIG. 14) which was described in the second embodiment. That is, step S13a01 is added between step S9a03 and step S9a04 as shown in FIG. 23. At step S13a01, the virtual volume ID that was moved at the previous step and the destination tier ID are passed as parameters to call the prediction information bias correction process S1201 (see FIG. 26).

Figure 24:
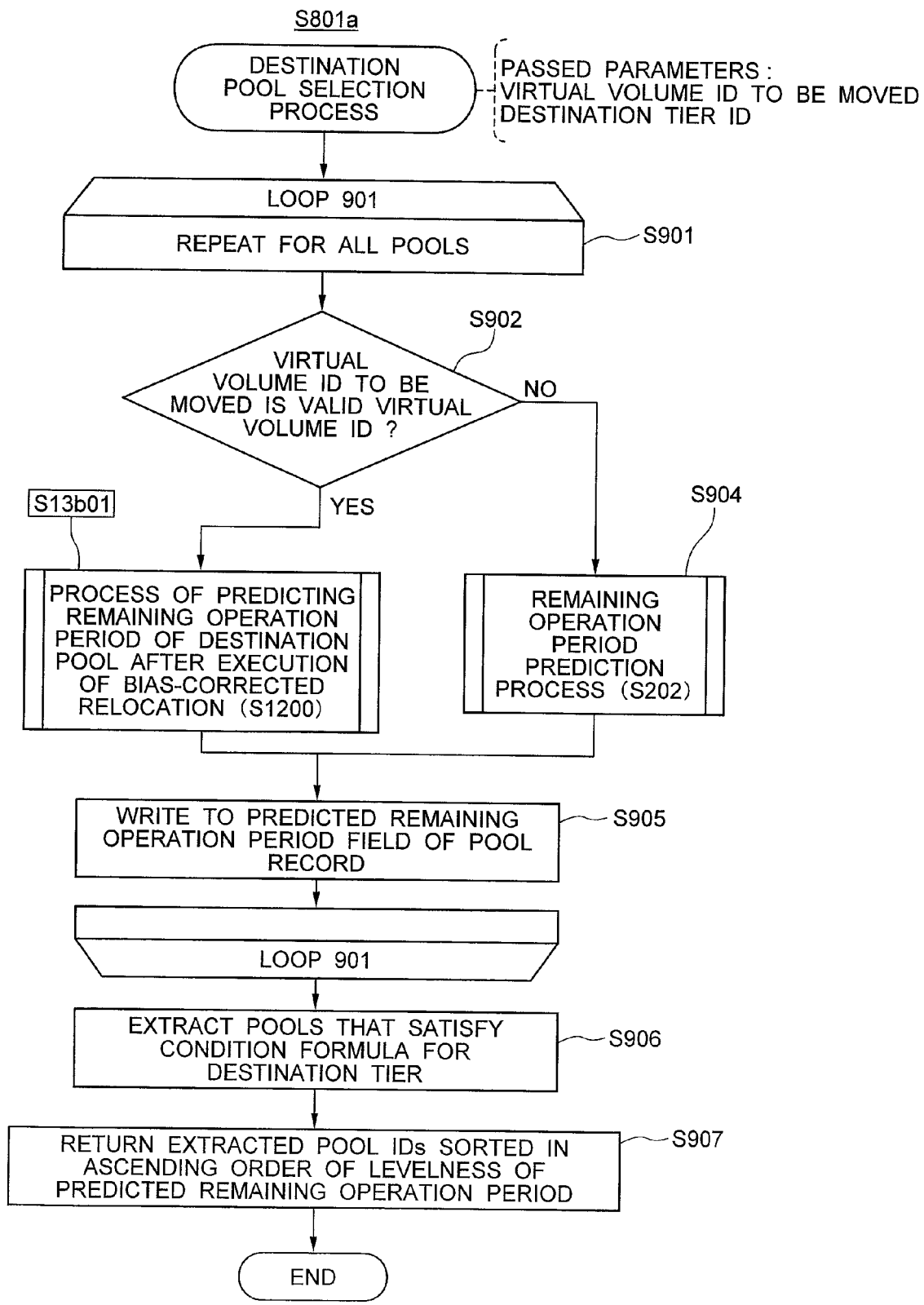
FIG. 24 is a flowchart illustrating the destination pool selection process according to the fourth embodiment.

FIG. 24 is a flowchart illustrating the destination pool selection process in the fourth embodiment. The destination pool selection process S801a replaces one step in the destination pool selection process S801 (see FIG. 16) which was described in the second embodiment. As illustrated in FIG. 24, step S903 is replaced with step S13b01. At step S13b01, the process S1200 of predicting the remaining operation period of a destination pool after execution of bias-corrected relocation (see FIG. 25) is called by passing a virtual volume ID to be moved, the pool ID of a pool that is being processed in the loop 901, and a destination tier ID.

Figure 25:
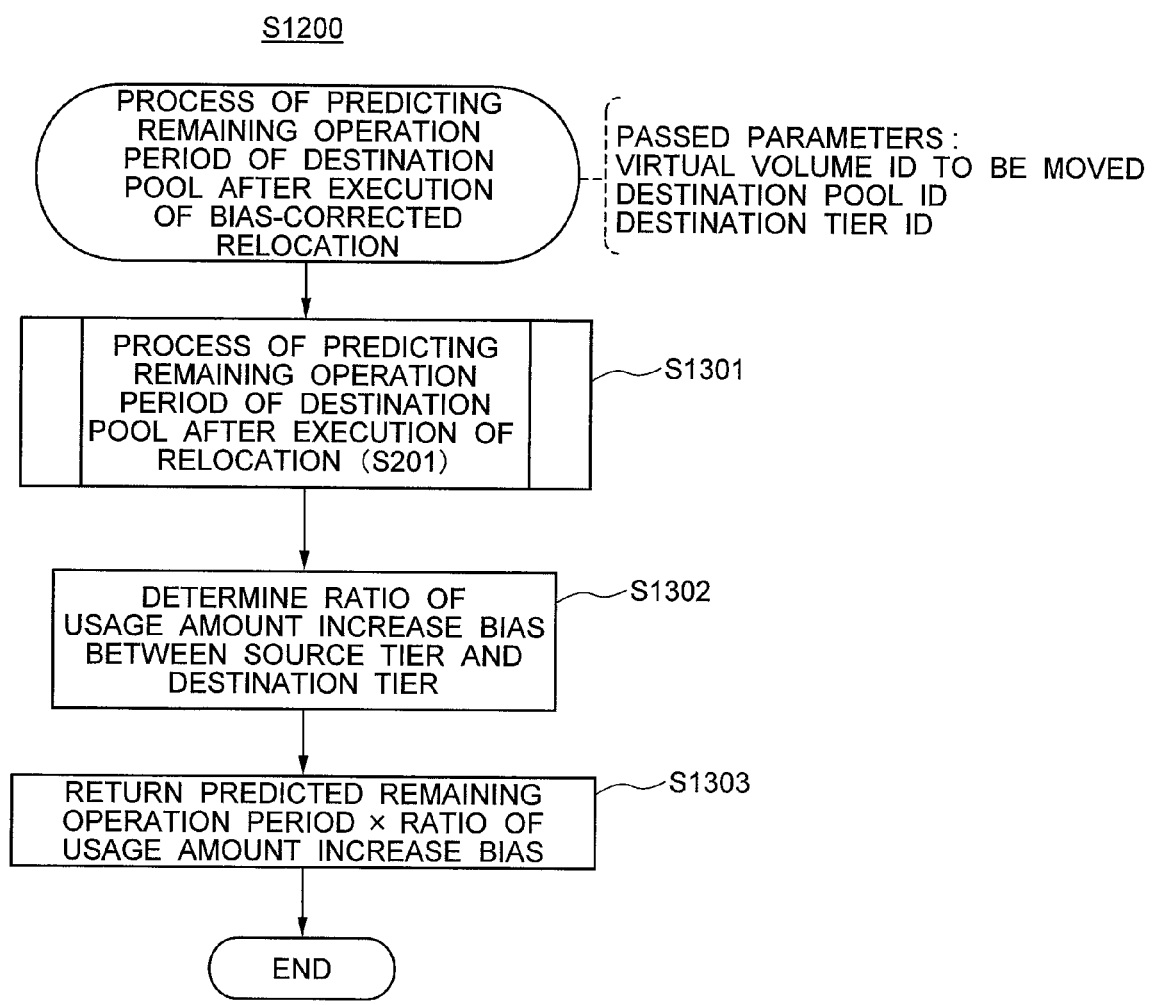
FIG. 25 is a flowchart illustrating the process of predicting the remaining operation period of a destination pool after execution of bias-corrected relocation.

FIG. 25 shows a flowchart illustrating the process of predicting the remaining operation period of a destination pool after execution of bias-corrected relocation. With reference to FIG. 25, description will be given of the procedure of the process S1200 of predicting the remaining operation period of a destination pool after execution of bias-corrected relocation in sequence. The process S1200 of predicting the remaining operation period of a destination pool after execution of bias-corrected relocation receives a virtual volume ID to be moved, a destination pool ID, and a destination tier ID as parameters, and returns the predicted remaining operation period of the destination pool that is corrected with differences of usage amount increase bias among tiers.

At step S1301, the process S201 of predicting the remaining operation period prediction process of a destination pool after execution of relocation (see FIG. 8) is called by passing the virtual volume ID to be moved and the destination pool ID. At step S1302, the ratio of usage amount increase bias between the source tier and the destination tier is determined. The usage amount increase bias for the destination tier can be determined by obtaining the value in the usage amount increase bias field 343 (see FIG. 22) of the tier record 340 that corresponds to the destination tier. The usage amount increase bias for the source tier can be determined by first obtaining the value (i.e., a tier ID) in the last destination tier field 305 (see FIG. 12) of the virtual volume record 300 that corresponds to the virtual volume to be moved and then obtaining the value in the usage amount increase bias field 343 of the tier record 340 that corresponds to that tier. The ratio of usage amount increase bias is determined by dividing the usage amount increase bias of the destination tier by that of the source tier. At step S1303, the predicted remaining operation period determined at step S1301 is multiplied by the usage amount increase bias ratio determined at step S1302 and the result is returned as a returned value.

Figure 26:
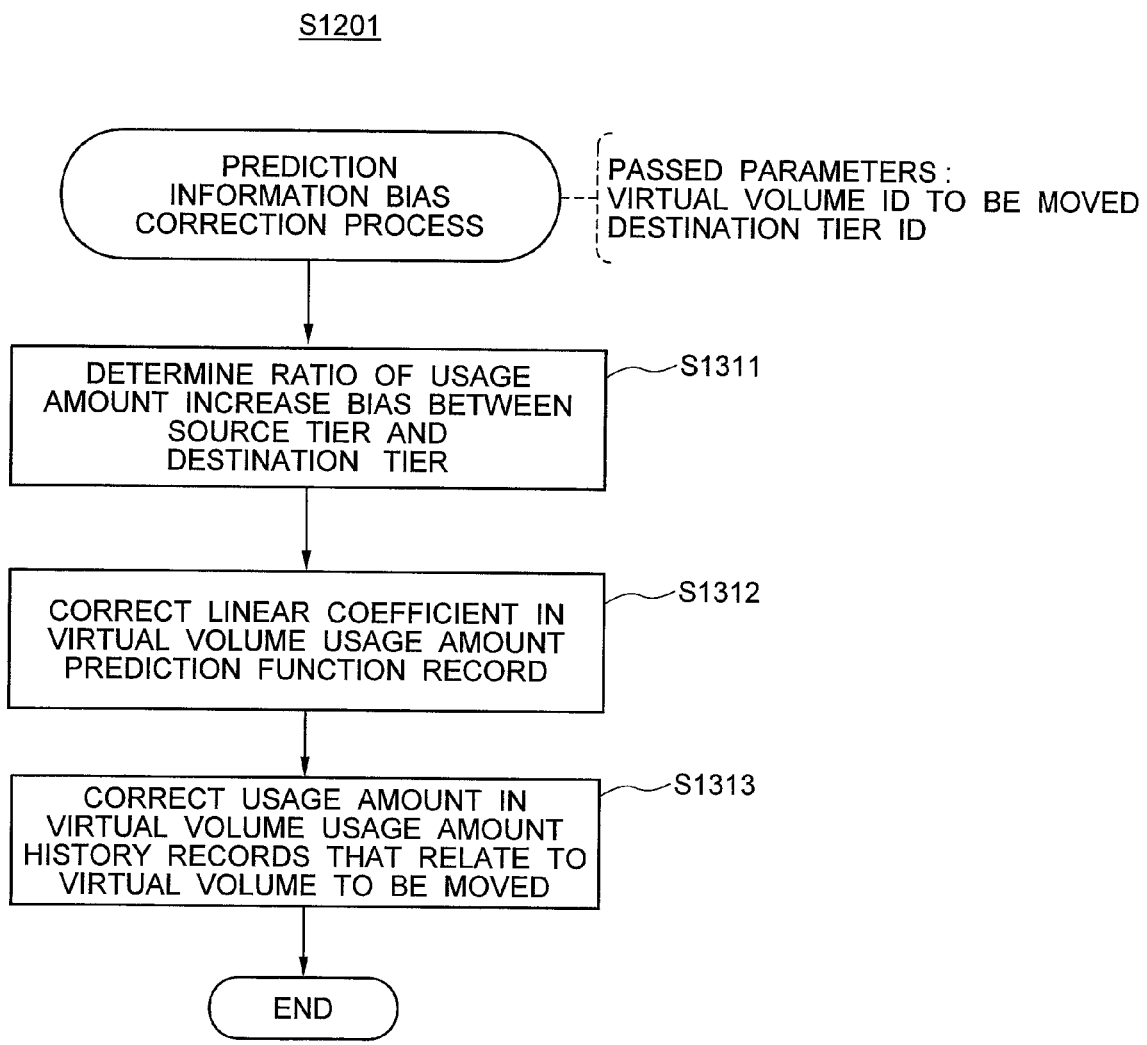
FIG. 26 is a flowchart illustrating a prediction information bias correction process.

FIG. 26 shows a flowchart illustrating the prediction information bias correction process. With reference to FIG. 26, the procedure of the prediction information bias correction process S1201 will be described in sequence. The prediction information bias correction process S1201 receives a virtual volume ID to be moved and a destination tier ID as parameters and corrects contents of the virtual volume usage amount prediction function table 212 (see FIG. 5C) and the virtual volume usage amount history table 213 (see FIG. 5D) based on differences of usage amount increase bias among tiers.

At step S1311, the ratio of usage amount increase bias between the source tier and the destination tier is determined by the same method as at step S1302 (see FIG. 25). At step S1312, the linear coefficient field 322 of the virtual volume usage amount prediction function record 320 (see FIG. 5C) that corresponds to the virtual volume to be moved is updated with the product of the current value and the ratio of usage amount increase bias determined at step S1311. At step S1313, the actual usage amount field 333 of all the virtual volume usage amount history records 330 (see FIG. 5D) that correspond to the virtual volume to be moved is updated with the product of the current value and the ratio of usage amount increase bias determined at step S1311.

This embodiment is configured to predict change of trend in usage amount increase of a virtual volume associated with its relocation and corrects prediction of remaining operation periods after relocation based on tier definitions. Accordingly, even when the trend of increase in usage amount of a virtual volume changes due to relocation, e.g., relocation between tiers having different levels of performance, it is easy to perform relocation appropriately taking the change into consideration.

Fifth Embodiment

A fifth embodiment of the present invention will be described. The fifth embodiment is a variation of the second embodiment. A characteristic of this embodiment is that it selects a destination tier to which movement is possible and that is most appropriate from a plurality of tiers and selects a destination pool from that tier based on a tier selection policy defined by the user which is composed of a plurality of prioritized destination candidate tiers while considering predicted remaining operation periods of pools.

Another characteristic of the embodiment is that it allows mixing of a tier that is composed of pools and a tier that is composed of general volumes that are not used as pools within destination candidate tiers that represent a policy for destination tier selection, and selects a destination from them considering capacity overhead.

Yet another characteristic of the embodiment is that it checks whether it is possible to move each virtual volume to a better tier than the one to which it was last moved, and if possible, relocates the virtual volume to that tier so as to maintain arrangement of data in the best state according to the present condition (hereinafter such relocation will be called "optimizing relocation").

Figure 27:
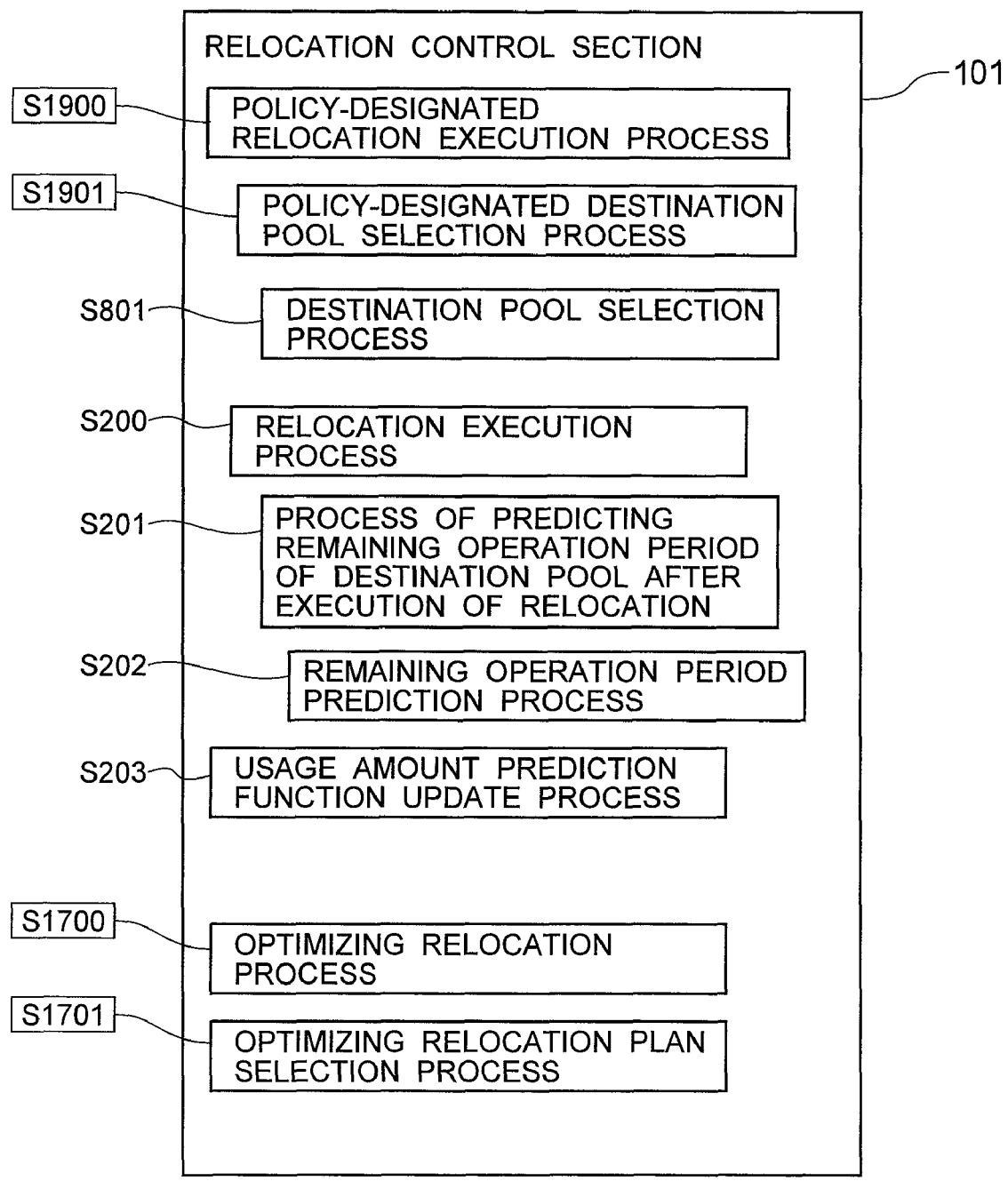
FIG. 27 shows the configuration of the relocation control section according to a fifth embodiment.

FIG. 27 shows the configuration of the relocation control section of the fifth embodiment. Components common to those shown in FIG. 11 are given the same reference numerals and descriptions of them are omitted. The relocation control section 101 deletes the tier-designated relocation execution process S800 and has a policy-designated relocation execution process S1900, a policy-designated destination pool selection process S1901, an optimizing relocation process S1700, and an optimizing relocation plan selection process S1701 as additional modules.

Figure 28:
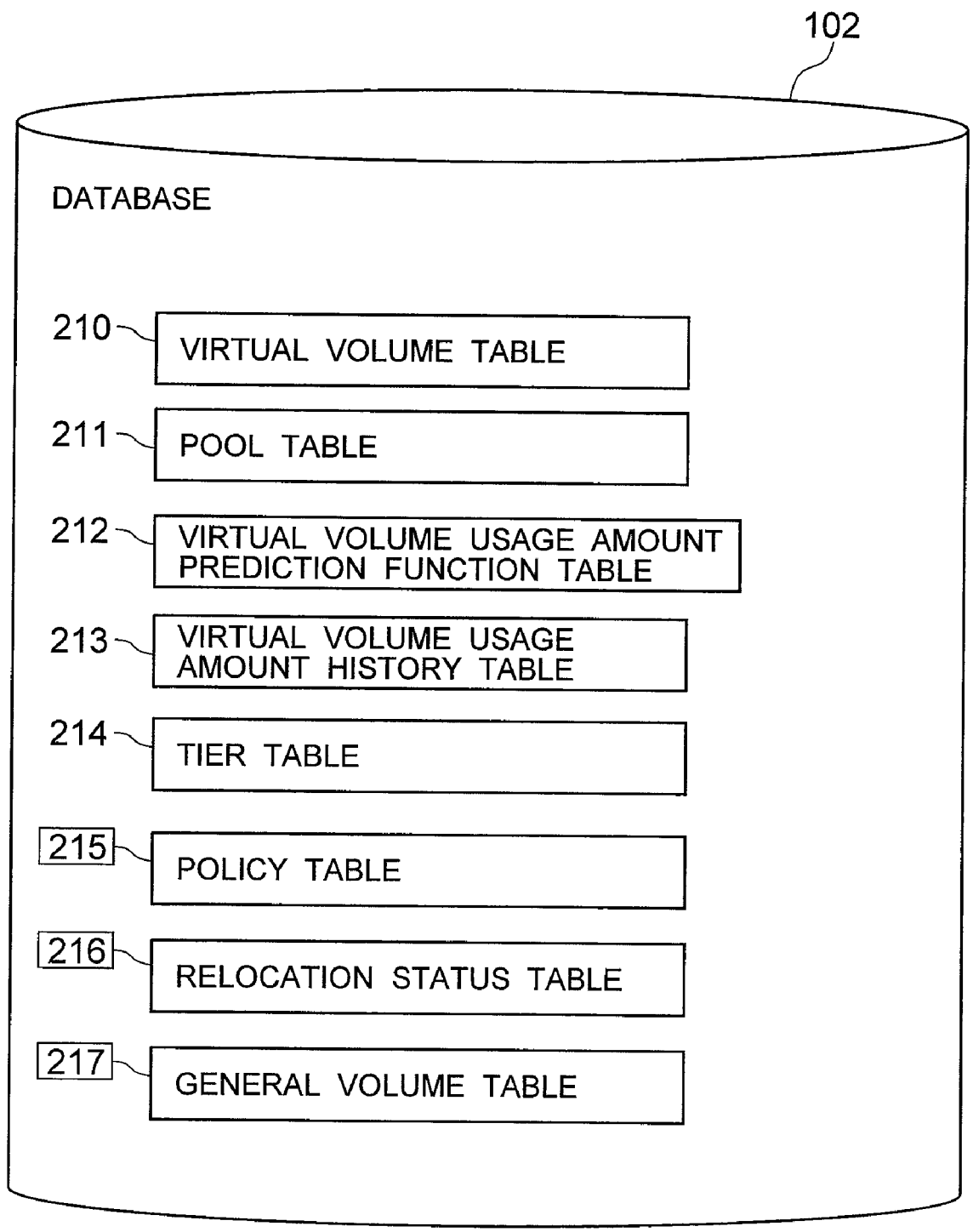
FIG. 28 shows the structure of a database according to the fifth embodiment.

FIG. 28 shows the structure of a database according to the fifth embodiment. Components common to those shown in FIG. 12 are given the same reference numerals and descriptions of them are omitted. The database 102 has a policy table 215, a relocation status table 216, and a general volume table 217 as additional tables. The tier table 214 has a tier type field 344 (see FIG. 29A) as an additional field.

FIGS. 29A to 29D show the structures of the tier table, the policy table, the relocation status table, and the general volume table. As illustrated in FIG. 29A, in the tier type field 344 of the tier table 214, either of two values "pool" or "general volume" that indicates whether a tier is formed of pools 113 or general volumes 112 is stored. In the former case, a condition for selecting a pool 113 is described as a condition formula for the pool record 310 in the condition formula field 342 as described above in the second embodiment. In the latter case, a condition for selecting a general volume 112 is described in the condition formula field 342 as a condition formula for the general volume record 370. This enables mixing of a tier formed of pools 113 and a tier formed of general volumes 112 in the tier table 214.

The policy table 215 shown in FIG. 29B is composed of collection of policy records 350 that correspond to destination candidate tiers contained in a policy. The policy record 350 includes, at least, a policy ID field 351 that indicates the name of a policy represented by that record, a priority field 352 that indicates the rank of a candidate, a tier field 353 that indicates a destination tier, and a capacity efficiency field 354. The priority field 352 is an integer value, which indicates that the smaller the value is, the more appropriate the destination candidate tier is for the user and thus should be adopted as a relocation destination preferentially. The capacity efficiency field 354 is a value that is significant only when the tier type of a tier indicated by the tier field 353 is "general volume" and stores the minimum value of capacity efficiency (the proportion of an actual usage amount to a volume capacity) that is required for permitting relocation to that tier. The value in the capacity efficiency field 354 is determined by the user based on how much capacity overhead the user accepts that is caused in relocation from a virtual volume to a general volume.

The relocation status table 216 in FIG. 29C is composed of collection of relocation status records 360 each of which records a policy that was applied in the last relocation execution and the priority of an adopted destination candidate tier for one virtual volume. The relocation status record 360 consists of, at least, a virtual volume ID field 361, a last applied policy field 362 that stores the ID of a policy that was applied in the last relocation execution, and a last applied priority field 363 that stores the priority of a destination candidate tier that was adopted in the last relocation execution.

The general volume table 217 of FIG. 29D is composed of collection of general volume records 370 that store attribute information and usage of each general volume 112 in the storage device 110. The general volume record 370 has, at least, a general volume ID field 371 that stores the ID of a general volume; a capacity field 372, a RAID type field 373 and a performance type field 374 that respectively store capacity, RAID type, and performance type, which are attribute information of a general volume; and a usage state field 375 that indicates whether a general volume is in use or not as one of two values "in use" and "unused". The usage state of a general volume that makes a portion of a pool is always set to "in use".

Here, to describe the meaning of a policy more clearly, exemplary structures of the tier table 214 and the policy table 215 will be described with reference to FIGS. 30A and B.

FIGS. 30A and B show exemplary structures of the tier table and the policy table. FIG. 30A shows the structure of the tier table 214, where a tier record 340a represents a "high-speed and high reliability" tier that is conditional on a pool that is formed by a high-speed disk implemented with a highly reliable RAID type and has a predicted remaining operation period of 14 days or more. A tier record 340b represents a "high-speed" tier that is conditional on a pool that is formed by a high-speed disk implemented with a RAID type of medium reliability and has a predicted remaining operation period of seven days or more. A tier record 340c represents a "low-speed" tier that is conditional on a pool that is formed by a low-speed disk implemented with a RAID type of medium reliability and has a predicted remaining operation period of seven days or more. A tier record 340d represents a "very high-speed" tier that is conditional on a general volume on a high-speed disk that is implemented with a RAID type of medium reliability. Because a tier represented by the tier record 340d is a tier composed of general volumes, it is different from other tiers composed of pools and a condition on predicted remaining operation period is not contained in its condition formula.

FIG. 30B shows the structure of the policy table 215, where policy records 350a and 350b represent a "reliability-compromised" policy that designates the "high-speed and high-reliability" tier as the most appropriate candidate and the "high-speed" tier as the second most appropriate candidate. This policy represents a user's intention that the user wants to use a tier that is as high-speed and reliable as possible but, if a sufficient remaining operation period cannot be secured for the tier, may use another tier that is less reliable.

Policy records 350c and 350d represent a "performance-compromised" policy that designates the "high-speed" tier as the most appropriate candidate and the "low-speed" tier as the second most appropriate candidate. This policy represents the user's intention that the user wants to use a tier that is as high-speed as possible, but if a sufficient remaining operation period cannot be secured for the tier, may use another tier that has lower performance.

Policy records 350e, 350f and 350g represent a "cost-compromised" policy that designates the "high-speed" tier as the most appropriate candidate and the "high-speed and high-reliability" tier as the second most appropriate candidate and the "very high-speed" tier as the third most appropriate candidate. This policy represents the user's intention that the user wants to use a tier that has medium reliability and high cost performance, but if a sufficient remaining operation period cannot be secured for the tier, may use a highly reliable and expensive tier. This policy further represents the user's intention that, when even the highly reliable tier cannot be used, the user may use a tier formed of general volumes as long as its utilization rate is 60% or more (i.e., the proportion of the actual usage amount of a virtual volume to be moved to its virtual capacity is 60% or more).

Now, with reference to FIGS. 31, 32, 33, 34, 35 and 36, description will be given of a way for the user to instruct relocation of a virtual volume according to a policy and relocate the designated virtual volume. Modules that operate when relocation is performed in accordance with a user-specified policy include the policy-designated relocation execution process S1900 (see FIG. 32) and the policy-designated destination pool selection process S1901 (see FIG. 34). Further, modules that operate when optimizing relocation is performed include the optimizing relocation process S1700 (see FIG. 35) and the optimizing relocation plan selection process S1701 (see FIG. 36).

FIG. 31 shows a screen for instructing policy-designated relocation. With reference to FIG. 31, description will be given of an operation method for the user to instruct relocation of a virtual volume according to a policy and call the policy-designated relocation execution process S1900. A policy-designated relocation instructing screen 20s01 includes a tree area 4s02, a pool information area 4s03, a virtual volume information area 4s04, and a policy specifying area 20s02. The tree area 4s02, the pool information area 4s03, and the virtual volume information area 4s04 are the same as the ones described in the first embodiment (see FIG. 6). The policy specifying area 20s02 displays a list table of rectangles corresponding to policies that are registered in the policy table 215 along with their policy IDs. FIG. 31 illustrates that rectangles 20s20, 20s21 and 20s22 are displayed that correspond to policies with a policy ID of "reliability-compromised", "performance-compromised" and "cost-compromised", respectively.

The user can instruct relocation of a virtual volume according to any one of the policies by dragging and dropping a node that represents a virtual volume in the tree area 4s02 onto any one of the rectangles in the policy specifying area 20s02 using a mouse. For example, by dragging and dropping the node 4s20 onto the rectangle 20s20, the user can instruct relocation of the virtual volume that has a virtual volume ID of 0000 according to the policy having a policy ID of "reliability-compromised". When the user gives a relocation instruction on the policy-designated relocation instructing screen 20s01 shown in FIG. 31 in this manner, the policy-designated relocation execution process S1900 is executed as illustrated in FIG. 32.

Figure 32:
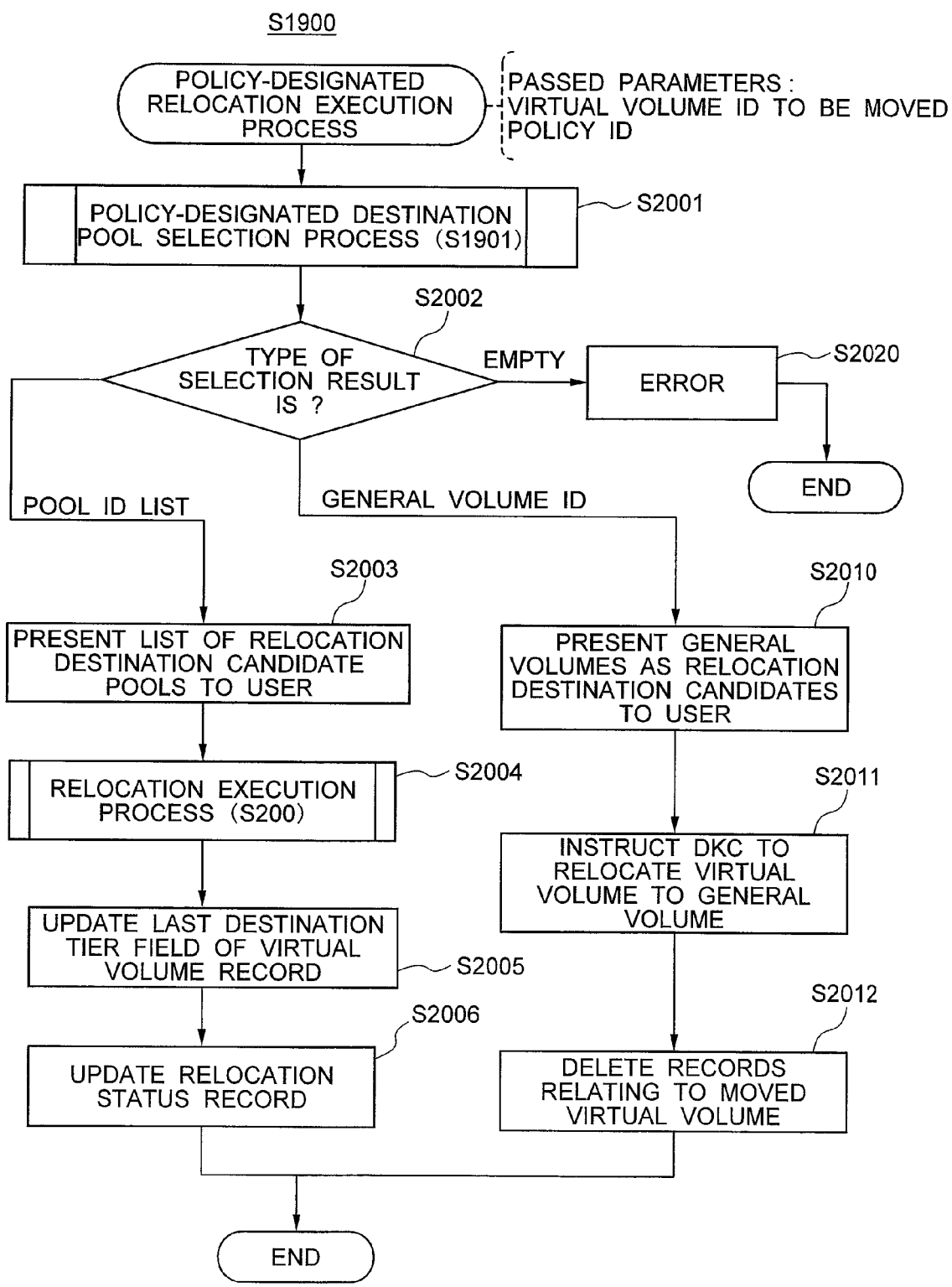
FIG. 32 is a flowchart illustrating a policy-designated relocation execution process.

FIG. 32 is a flowchart that illustrates the policy-designated relocation execution process. The policy-designated relocation execution process S1900 is called by the user instructing relocation of a virtual volume according to a policy via the browser 121 with an operation method that was discussed above. The policy-designated relocation execution process S1900 receives a virtual volume ID to be moved and a policy ID as parameters. The policy-designated relocation execution process S1900 is executed by the CPU 2200.

Figure 34:
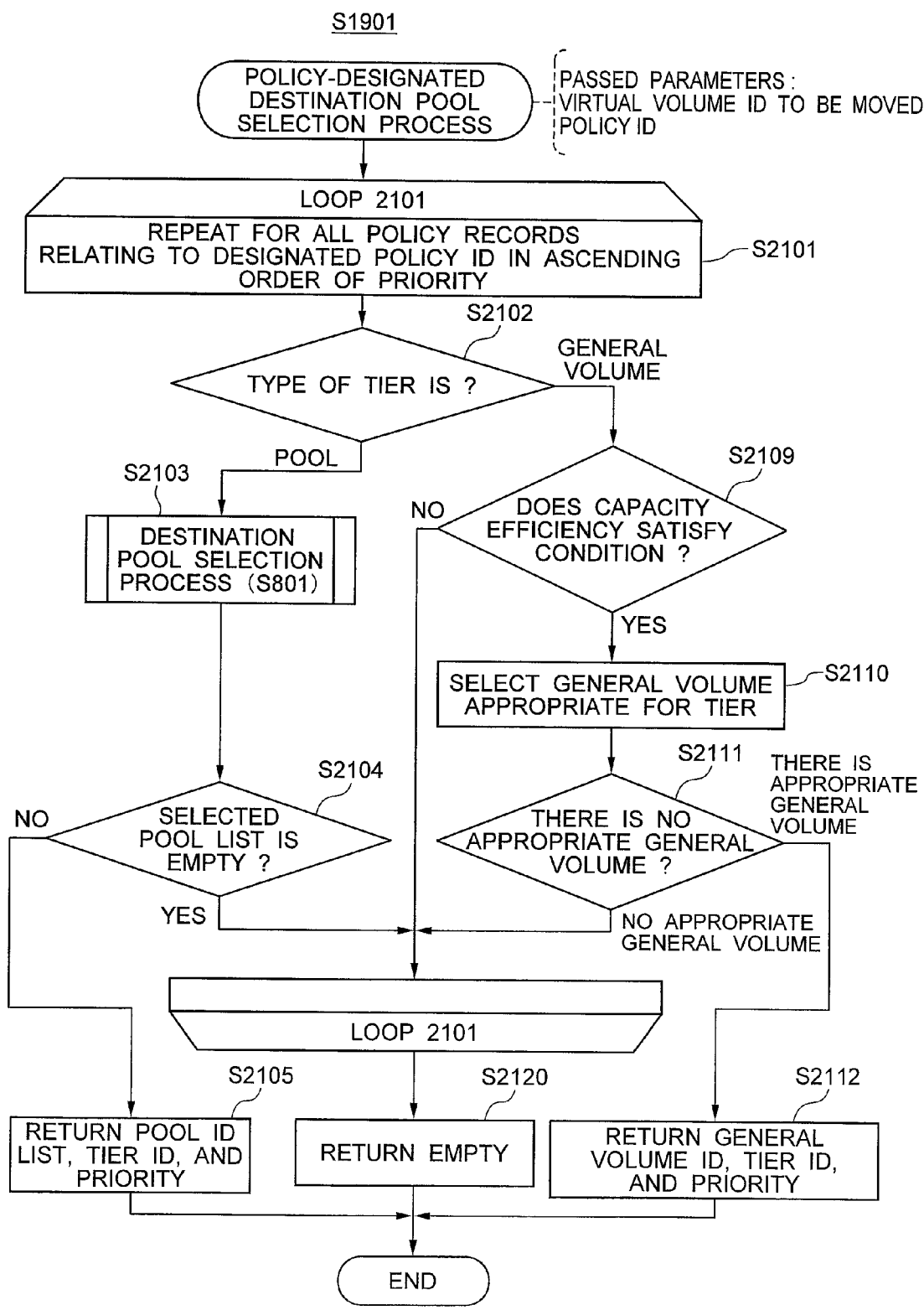
FIG. 34 is a flowchart illustrating a policy-designated destination pool selection process.

At step S2001, a virtual volume ID to be moved and a policy ID are passed to call the policy-designated destination pool selection process S1901 (see FIG. 34). At step S2002, the type of a returned value at step S2001 is determined. If it is a list of pool IDs (pool ID list at step S2002), the procedure proceeds to step S2003. If it is a general volume ID (general volume ID at step S2002), the procedure proceeds to step S2010. If it is empty (empty at step S2002), the procedure proceeds to step S2020.

At step S2003, the pool ID list obtained at step S2001 is used to create a list table of destination candidate pools that contains attribute information for the pools and a selection button in each row, which is presented to the user via the browser 121 as illustrated in FIG. 33 and the procedure waits for the user to press a selection button. Attribute information for a pool contained in a row includes, at least, the ID and predicted remaining operation period of the pool. The selection button in the first row of the list table is set as the default button. Further, as the header of the list table, the tier ID obtained at step S2001 is included.

FIG. 33 illustrates an example of specific display of the destination candidate pool list table. A destination candidate pool list table 20t05 includes a pool ID column 20t51, a predicted remaining operation period column 20t52, and a selection button column 20*t*53 as columns, and also includes a header area 20*t*06 in which a tier selected as a destination is indicated. The header area 20*t*06 illustrated here shows that the tier having a tier ID of "high-speed" is selected as destination. A row 20*t*54 shows that the pool with a pool ID of 00 is the first destination candidate and its predicted remaining operation period after execution of relocation is 100 days. A row 20*t*55 shows that the pool with a pool ID of 08 is the second destination candidate and its predicted remaining operation period after execution of relocation is 70 days. The user clicks on a selection button in the selection button column 20*t*53 with a mouse to select a destination pool. The selection button in the row 20*t*54, i.e., the first row, is selected as the default button and the user can select a pool as the first destination candidate through an operation such as pressing Enter key, for example.

Referring FIG. 32 again, at step S2004, the relocation execution process S200 (see FIG. 7) is called and the virtual volume given as a parameter is moved to the pool selected at step S2003. At step S2005, as processing for updating the last destination tier field of the virtual volume record, the value of the destination tier (i.e., a tier ID) is written to the last destination tier field 305 (see FIG. 12) of the virtual volume record 300 that corresponds to the virtual volume moved. At step S2006, the policy ID used this time and priority obtained at step S2001 are updated and stored in the last applied policy field 362 and the last applied priority field 363 of the relocation status record 360 (see FIG. 29C) that corresponds to the virtual volume moved, respectively. Then, the series of processes is terminated.

At step S2010, the general volume ID obtained at step S2001 is used to present attribute information for the general volume and a confirmation button to the user via the browser 121 and the procedure waits for the user to press the confirmation button. At step S2011, an instruction is given to the DKC 111 to relocate the designated virtual volume to the general volume obtained at step S2001. At step S2012, records relating to the virtual volume moved are deleted from the virtual volume table 210, virtual volume usage amount prediction function table 212, virtual volume usage amount history table 213, and relocation status table 216. Then, the series of processes is terminated. At step S2020, an error is indicated to the user via the browser 121 and the series of processes is terminated.

As another embodiment, the first one of the pool ID list obtained at step S2001 may be automatically selected instead of having the user select a pool at step S2003.

FIG. 34 is a flowchart that illustrates the policy-designated destination pool selection process. The policy-designated destination pool selection process S1901 receives a virtual volume ID to be moved and a policy ID that is used for selecting a destination. The process S1901 returns the ID and priority of a destination tier that is selected according to the policy and, when the type of the destination tier is pool, also returns a list of destination candidate pool IDs that is sorted in descending order of predicted remaining operation period, and when the type of the destination tier is general volume, returns volume IDs of destination candidate volumes. If a pool or general volume appropriate as a destination is not found, it returns empty. The policy-designated destination pool selection process S1901 is executed by the CPU 2200.

At step S2101, all policy records 350 (see FIG. 29B) that relate to the designated policy ID are selected and steps S2102 through S2104 and steps S1209 through S2111 are repeated for them in ascending order of the priority field 352. At step S2102, the type of a tier that is represented by the tier field 353 of the policy record 350 currently being processed is determined by referencing the tier type field 344 of the tier record 340 (see FIG. 29A). If the type of the tier is "pool" (pool at step S2102), the procedure proceeds to step S2103, and if the type is "general volume" (general volume at step S2102), the procedure proceeds to step S2109.

At step S2103, the virtual volume ID to be moved and the value in the tier field 353 of the policy record 350 currently being processed are passed to call the destination pool selection process S801 (see FIG. 16). At step S2104, it is determined whether the selected pool ID list is empty or not. If it is determined that the list is empty (Yes at step S2104), the process is continued iteratively, and if it is determined that the list is not empty (No at step S2104), the procedure proceeds to step S2105. At step S2105, the values in the tier field 353 and the priority field 352 of the policy record 350 that has been processed and the pool ID list obtained at step S2103 are returned, terminating the series of processes.

At step S2109, the capacity efficiency (the proportion of an actual usage amount to a virtual capacity) of the virtual volume to be moved is calculated and it is determined whether the value is equal to or larger than the value in the capacity efficiency field 354 of the policy record 350 that is currently being processed. If the result of the determination is true (Yes at step S2109), the procedure proceeds to step S2110, and if the result is false (No at step S2109), the process is continued iteratively.

At step S2110, an unused general volume that has the same capacity as the virtual volume and that satisfies the condition formula field 342 of the tier record 340 that corresponds to the tier represented by the tier field 353 of the policy record 350 that is currently being processed is retrieved or selected from the general volume table 217. At step S2111, it is determined whether a general volume has been found at step S2110. If no general volume is found ("no appropriate general volume" at step S2111), the process is continued iteratively, and if a general volume is found ("there is an appropriate general volume" at step S2111), the procedure proceeds to step S2112. At step S2112, the values in the tier field 353 and the priority field 352 of the policy record 350 that has been processed as well as the general volume ID obtained at step S2110 are returned and the series of processes is terminated. At step S2120, empty is returned to terminate the series of processes.

Figure 35:
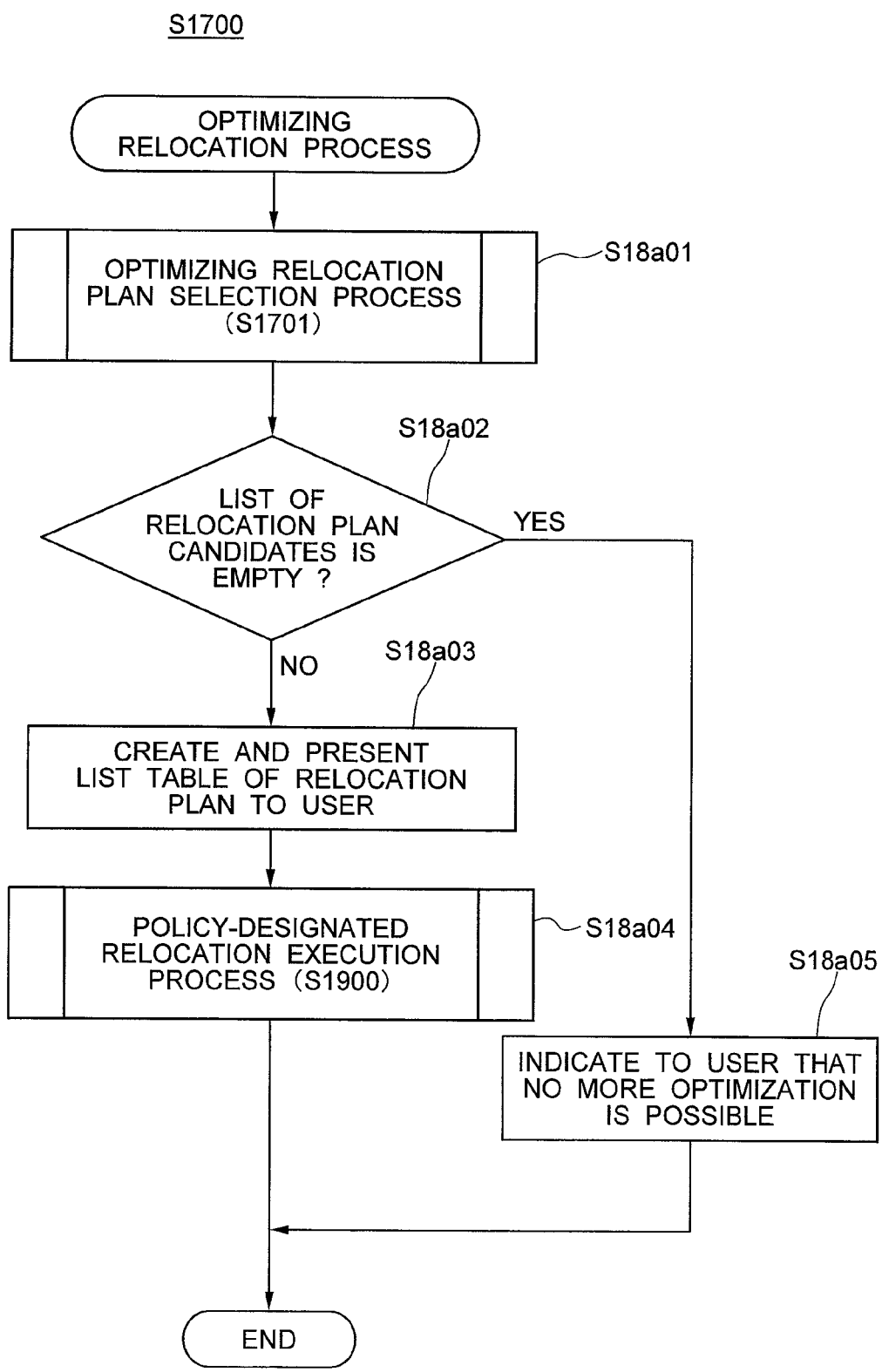
FIG. 35 is a flowchart illustrating an optimizing relocation process.

FIG. 35 is a flowchart illustrating the optimizing relocation process. The optimizing relocation process S1700 is called by the user instructing optimizing relocation via the browser 121. The process may also be automatically activated in response to some trigger. The procedure of the optimizing relocation process S1700 will be described in detail below with respect to FIG. 35. The optimizing relocation process S1700 is executed by the CPU 2200.

At step S18*a*01, the optimizing relocation plan selection process S1701 (see FIG. 36) is called. At step S18*a*02, it is determined whether a list of relocation plan candidates obtained at step S18*a*01 is empty or not. If it is determined that the list is not empty (No at step S18*a*02), the procedure proceeds to step S18*a*03, and if it is determined that the list is empty (Yes at step S18*a*02), the procedure proceeds to step S18*a*05.

At step S18*a*03, the list of relocation plan candidates obtained at step S18*a*01 is used to create a list table of relocation plan candidates that contains an attribute value for a relocation plan and a selection button in each row, which is presented to the user via the browser 121 and the procedure waits for the user to press a selection button. Attributes of a relocation plan contained in a row include a virtual volume ID, a last applied policy ID, a last destination tier ID, and a destination tier ID. At step S18a04, for a relocation plan selected by the user, the virtual volume ID in the plan and a policy ID that was applied the last time are passed to call the policy-designated relocation execution process S1900 (see FIG. 32). Then, the series of processes is terminated. At step S18a05, it is indicated to the user that optimizing relocation is currently impossible and the series of processes is terminated.

As another embodiment, it is possible to allow the user to select a number of relocation plans at step S18a03 and step 18a04 is applied repetitively for those relocation plans. It is also possible to automatically execute some or all of relocation plan candidate list instead of having the user select a relocation plan at step S18a03.

Figure 36:
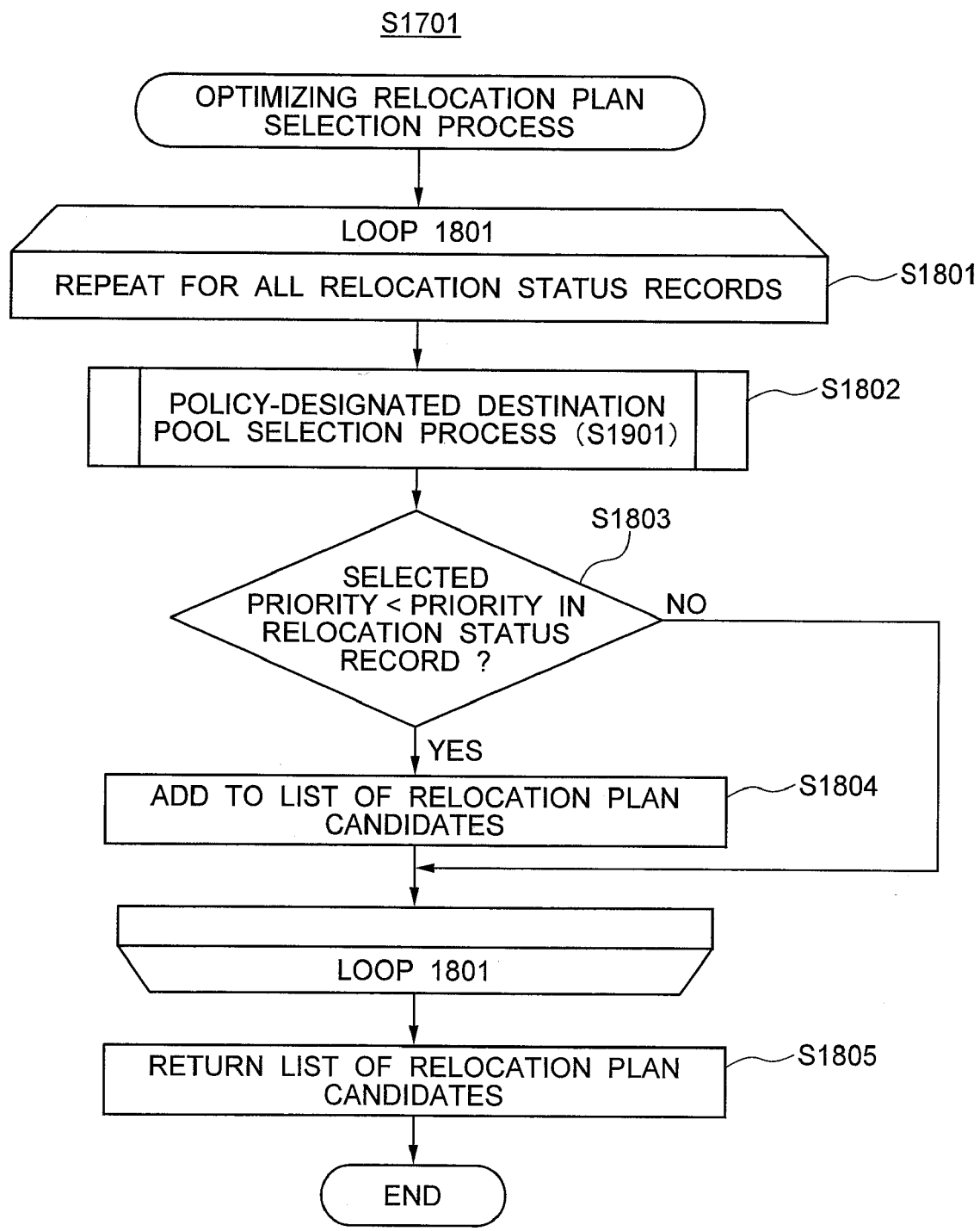
FIG. 36 is a flowchart illustrating an optimizing relocation plan selection process.

FIG. 36 is a flowchart illustrating the optimizing relocation plan selection process. With reference to FIG. 36, the optimizing relocation plan selection process S1701 will be described in detail. At step S1801, step S1802 through S1804 are repeated for all relocation status records 360. At step S1802, the values in the virtual volume ID field 361 and the last applied policy field 362 of those relocation status records 360 are used to call the policy-designated destination pool selection process S1901 (see FIG. 34).

At step S1803, it is determined whether the pool ID list obtained at step S1802 is not empty and whether the value of priority obtained at step S1802 is smaller than the value in the last applied priority field 363 of each of the relocation status records 360. If the result of the determination is true (Yes at step S1803), the procedure proceeds to step S1804, and if the result is false (No at step S1803), the process is continued iteratively.

At step S1804, relocation plan candidate information which is a set of a virtual volume ID, a last applied policy ID, a last destination tier ID, and a destination tier ID is added to the list of relocation plan candidates. The value in the virtual volume ID field 361 of the relocation status record 360 is used as a virtual volume ID, the value in the last applied policy field 362 of the relocation status record 360 is used as a last applied policy ID, the value in the last destination tier field 305 of the virtual volume record 300 that corresponds to the virtual volume ID is used as a final moved tier ID, and the tier ID obtained at step S1802 is used as the value of the destination tier ID. At step S1805, a list of relocation plan candidates that was created at preceding steps is returned and the series of process is terminated.

As has been described, this embodiment is configured to select a tier to which movement is possible and that is most appropriate from among a number of tiers and select an optimal destination pool from that tier based on a user-defined policy for selecting a tier that consists of a plurality of prioritized destination candidate tiers while considering predicted remaining operation periods of pools. Thus, the user can easily and flexibly select a destination pool from a number of tiers while ensuring predicted remaining operation periods.

Also, the embodiment is configured to form a destination selection policy that mixes a tier consisting of pools and a tier consisting of general volumes and select a destination tier also considering reduction of capacity efficiency that is caused when a virtual volume is relocated to a general volume. The embodiment thus can appropriately determine which of a pool or general volume should be used as a destination in view of balance of requirements for remaining operation period and/or requirements for reduction of capacity efficiency, enhancing efficiency of a relocation task by the user.

In addition, the embodiment checks whether each virtual volume can be moved to a tier that is more appropriate than the tier to which it was last moved, and if there is such a tier, presents a plan for relocating the virtual volume to the tier (or an optimizing relocation plan) to the user and executes it. The user thus can easily find a virtual volume that can be relocated to a preferable tier and execute relocation in accordance with changing situations. For example, the user can easily relocate a virtual volume that has been temporarily located in the second most appropriate tier because a sufficient predicted remaining operation period could not be secured for a pool to the most appropriate location after increasing the capacity of the pool.

Sixth Embodiment

A sixth embodiment of the present invention will be described. The sixth embodiment is a variation of the second embodiment. A characteristic of this embodiment is that it prevents a user from inadvertently relocating a plurality of virtual volumes that should not be located in the same pool (e.g., virtual volumes that are used in a primary system and a stand-by system and/or virtual volumes that store data in a distributed manner for the purpose of distributing access burden) in the same pool. Thus, this embodiment is configured to determine a destination pool based on and in conformity with exclusive constraint definitions that are a plurality of exclusive constraints prescribing that two virtual volumes must not belong to the same pool.

Figure 37:
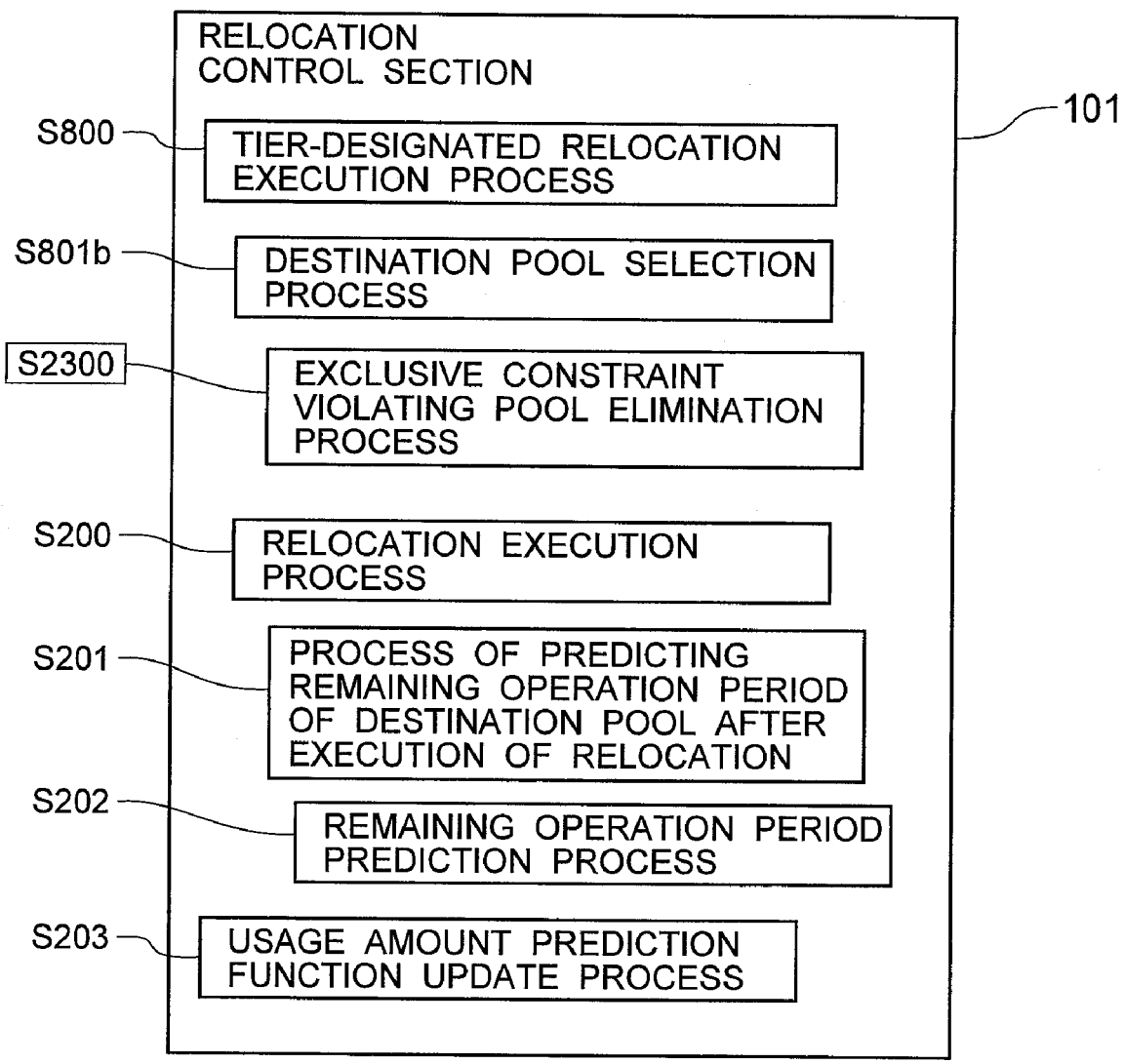
FIG. 37 shows the configuration of the relocation control section according to a sixth embodiment.

FIG. 37 shows the configuration of the relocation control section according to the sixth embodiment. Components common to those shown in FIG. 11 are given the same reference numerals and descriptions of them are omitted. The relocation control section 101 has an exclusive constraint violating pool elimination process S2300 as an additional module. In addition, a portion of the destination pool selection process is changed, which will be described later.

Figure 38:
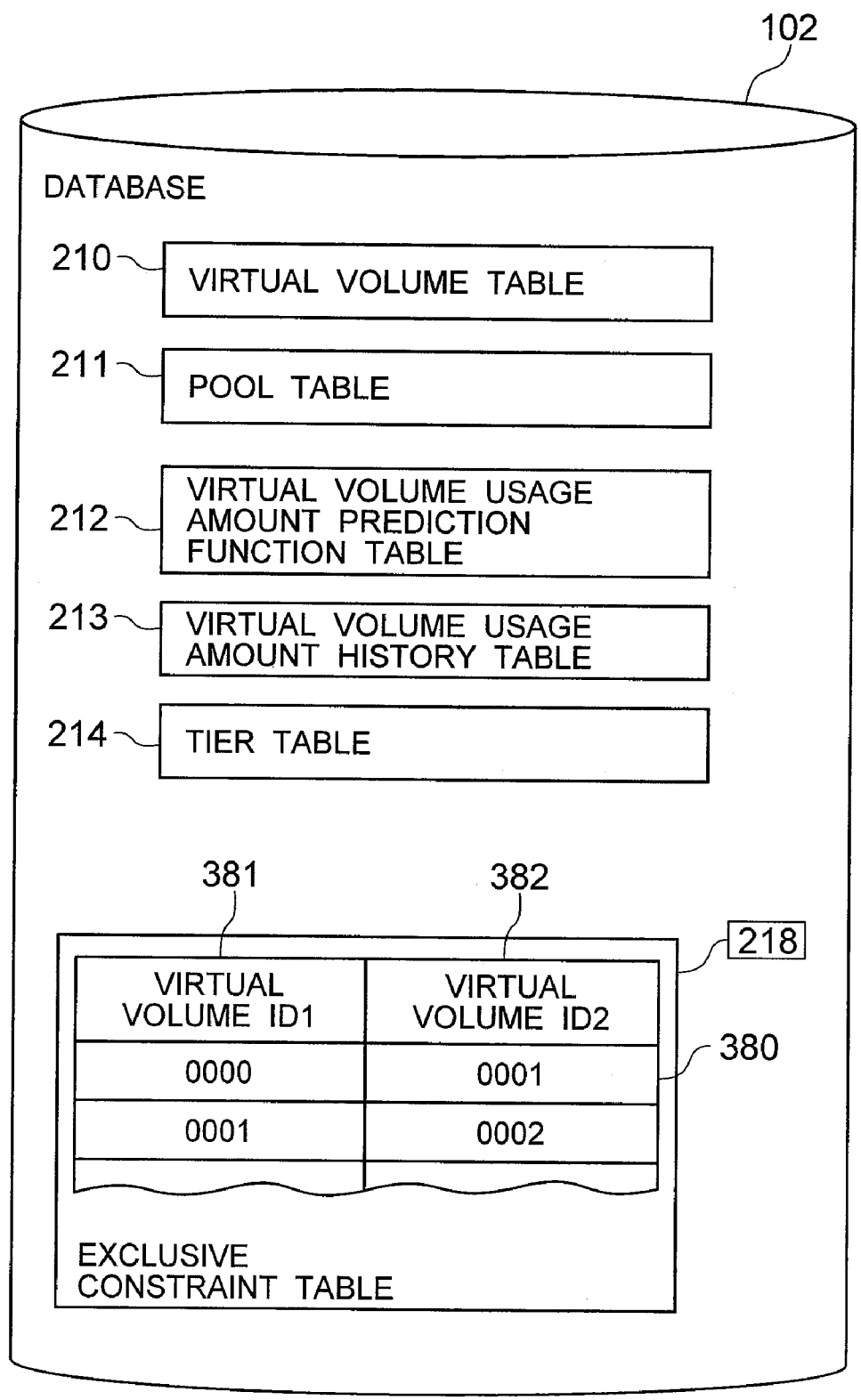
FIG. 38 shows the structure of a database according to the sixth embodiment.

FIG. 38 shows the structure of a database according to the sixth embodiment. Components common to those shown in FIG. 12 are given the same reference numerals and descriptions of them are omitted. The database 102 has an exclusive constraint table 218 as an additional table.

The exclusive constraint table 218 is composed of collection of exclusive constraint records 380 that indicate individual exclusive constraints. The exclusive constraint record 380 has, at least, a virtual volume ID1 field 381 and a virtual volume ID2 field 382 that store two virtual volume IDs that must not belong to the same pool.

Figure 39:
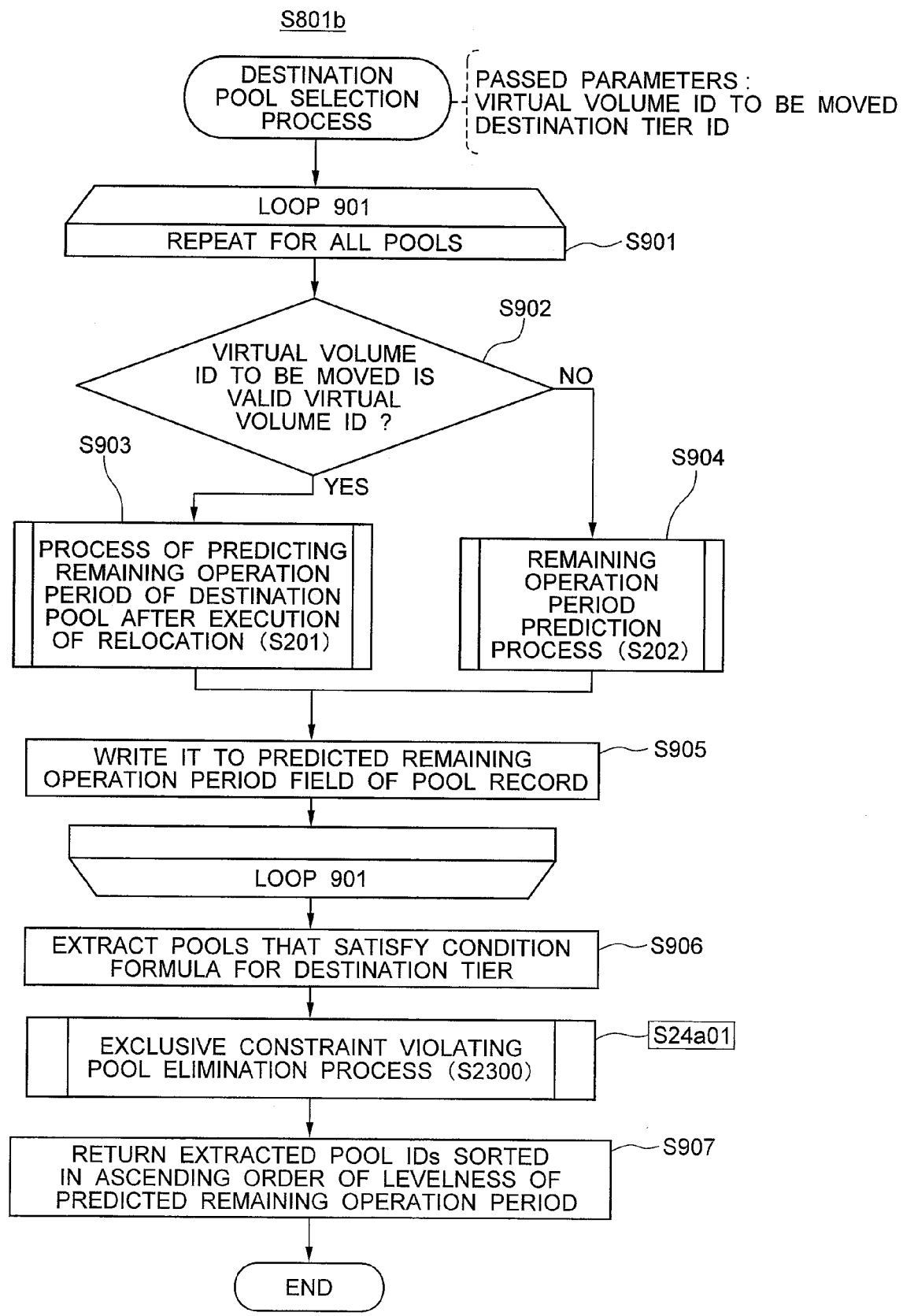
FIG. 39 is a flowchart illustrating the destination pool selection process according to the sixth embodiment.

FIG. 39 shows a flowchart that illustrates the destination pool selection process in the sixth embodiment. A destination pool selection process S801b adds one step to the destination pool selection process S801 described above in the second embodiment. As illustrated in FIG. 39, step S24a01 is added between steps S906 and S907. At step S24a01, a virtual volume ID to be moved and a list of pool IDs of pools that were extracted at the previous step are passed to call the exclusive constraint violating pool elimination process S2300 (see FIG. 40).

FIG. 40 is a flowchart illustrating the exclusive constraint violating pool elimination process. The exclusive constraint violating pool elimination process S2300 receives a virtual volume ID and a pool ID list as parameters and returns a pool ID list that is obtained by deleting the pool ID of a pool that contains a virtual volume between which and the virtual volume represented by the received virtual volume ID an exclusive constraint is defined from the received pool ID list.

At step S2401, the exclusive constraint table 218 is searched to extract all virtual volume IDs of virtual volumes between which and the virtual volume designated by the received virtual volume ID an exclusive constraint is defined.

In other words, extracted are all values in the virtual volume ID2 field of exclusive constraint records 380 whose virtual volume ID1 field is equal to the received virtual volume ID and all values in the virtual volume ID1 field of exclusive constraint records 380 whose virtual volume ID2 field is equal to the received virtual volume ID. For example, for the exclusive constraint table 218 shown in FIG. 38, when the received virtual volume ID is 0000, the result of extraction is 0001. Or when the received virtual volume ID is 0001, the result of extraction is 0000 and 0002.

At step S2402, all virtual volume records 300 that relate to the virtual volume IDs extracted at step S2401 are searched to retrieve the values in the pool ID field 302 of the records, thereby obtaining all pool IDs of pools to which virtual volumes corresponding to each of the extracted virtual volume IDs belong. At step S2403, all the pool IDs obtained at step S2402 are deleted from the pool ID list designated by a parameter and a resulting list of pool IDs is returned. Then, the series of processes is terminated.

As has been described, this embodiment is configured to determine a destination pool based on and in conformity with exclusive constraint definitions that are a plurality of exclusive constraints which prescribe that two virtual volumes must not belong to the same pool. The user thus can easily carry out relocation that ensures that a plurality of virtual volumes that should not be located in the same pool, e.g., virtual volumes that are used in a primary system and a stand-by system and/or virtual volumes that store data in a distributed manner for distributing access burden, are located in different pools.

The present invention can provide a relocation system and a relocation method capable of relocating a virtual volume that is formed on thin provisioning while ensuring security against exhaustion of pools. The present invention can further provide a relocation system and a relocation method for supporting determination of an optimal plan of virtual volume relocation among a plurality of pools that are managed as tiers while ensuring security against exhaustion of pools. Characteristics of the individual embodiments will be shown below.

The first embodiment can predict time periods till exhaustion of pools before and after relocation of a virtual volume and control relocation of virtual volumes based on the result of prediction.

In the second embodiment, the management server 100 for managing virtual volumes is characterized by including a storage section (e.g., the tier table 214) that stores a tier definition that consists of a plurality of conditions for classifying pools into tiers; a prediction section (e.g., the remaining operation period prediction process S202) that predicts time periods before the pools run out considering the conditions in the storage section; a selection section (e.g., the destination pool selection process S801) that selects pools as destination candidates based on the result of prediction by the prediction section; and a relocation section (e.g., the relocation execution process S200) that relocates a virtual volume to one of the pools as destination candidates selected by the selection section. With this configuration, in order to select an optimal destination pool while ensuring security against exhaustion of pools when relocating a virtual volume among pools that are managed as tiers, it is possible to classify the pools into tiers using preset conditions and select an optimal destination pool from a designated tier. And it is also possible to include conditions for time period till pool exhaustion in the preset conditions and evaluate the conditions for time period till pool exhaustion based on prediction.

The third embodiment can determine a virtual volume relocation plan that levels time periods till exhaustion of pools based on prediction in order to relocate a virtual volume into a state in which occurrence of pool exhaustion is less likely.

The fourth embodiment can correct a prediction based on difference of access frequency characteristics among tiers in order to accurately predict time periods till exhaustion of pools when relocating a virtual volume between tiers that have different access frequencies.

The fifth embodiment can select the most appropriate tier from a plurality of tiers in accordance with a preset policy on tier selection and select a destination pool from that tier in order to avoid relocation to a tier that would have been appropriate as a destination, e.g., due to risk of pool exhaustion and to enable relocation to another tier as the second best solution.

The fifth embodiment can also determine an executable relocation plan for relocating a virtual volume that is not appropriately located to a more appropriate tier in order to improve data arrangement after performing relocation in accordance with the second best solution.

Further, the fifth embodiment can permit mixing of a tier formed of pools and a tier formed of general volumes and select the most appropriate destination tier in consideration of reduction of capacity efficiency that is caused when a virtual volume is relocated to a general volume.

The sixth embodiment can determine a destination pool based on and in conformity with exclusive constraint definitions that are a plurality of exclusive constraints that prohibit two virtual volumes from belonging to the same pool.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A virtual volume relocation system comprising:
a storage comprising a plurality of pools and having one or more virtual volumes formed on the pools, the pools being formed of one or more general volumes,
wherein, in response to a writing instruction to the one or more virtual volumes, the storage allocates a storage area from the one or more general volumes forming the pools; and
a management server that manages the virtual volumes,
wherein the management server comprises:
a storage section that stores a tier definition that consists of a plurality of conditions for classifying the pools into tiers,
wherein the conditions include at least a definition of a usage amount increase bias that is predicted in accordance with a trend in usage increase of a tier relative to the other tiers in the pool;
a prediction section that predicts time periods in consideration of the conditions in the storage section, the time periods indicating an amount of time before the pools are exhausted in a configuration after relocation of the virtual volumes is executed,
wherein the prediction section estimates an increase in a usage amount of the pools based on the usage amount increase bias defined per tier;
a selection section that selects pools as destination candidates based on a result of prediction by the prediction section; and
a relocation section that executes the relocation of the virtual volume to one of the destination candidate pools selected by the selection section.

2. The relocation system according to claim 1, wherein, when there are a plurality of destination candidate pools in a tier designated as a destination, the selection section selects an appropriate destination pool based on predicted time periods before the plurality of destination candidate pools are exhausted after relocation.

3. The relocation system according to claim 2, wherein the selection section selects one of the destination candidate pools that increases levelness of time periods before the pools in the tier designated as a destination are exhausted as a more appropriate destination pool.

4. The relocation system according to claim 2, wherein the selection section determines a relocation plan that would improve levelness of time periods before the plurality of destination candidate pools are exhausted if a virtual volume is relocated in the designated tier.

5. The relocation system according to claim 1, wherein the prediction section predicts change of trend in usage amount increase of the virtual volumes associated with relocation of a virtual volume based on difference of characteristics of tiers, and corrects a prediction of time periods before the pools are exhausted after the relocation based on the prediction of change of trend in usage amount increase.

6. The relocation system according to claim 1, wherein the selection section selects a most appropriate tier as a destination from a plurality of tiers in accordance with a preset tier selection policy and selects a destination pool from the most appropriate tier.

7. The relocation system according to claim 6,
wherein the tier selection policy consists at least of a set of a destination candidate tier and a priority order, and
wherein the selection section selects one of the destination candidate tiers in which a pool selectable as a destination exists and that has the highest priority order as the most appropriate tier.

8. The relocation system according to claim 7, wherein the selection section selects a virtual volume that can be relocated to a tier that has a higher priority order than that of a tier which was selected as a most appropriate tier in a last relocation from among the virtual volumes, and selects relocation of the virtual volume to the tier having the higher priority as a relocation plan.

9. The relocation system according to claim 6, wherein the selection section selects a virtual volume that can be relocated to a tier more appropriate than a tier in which the virtual volume is currently located and selects a relocation plan in accordance with the tier selection policy.

10. The relocation system according to claim 6,
wherein the tier definition permits mixing of a condition for classifying pools into tiers and a condition for classifying general volumes into tiers, and
wherein the selection section selects the most appropriate tier taking into consideration reduction of capacity efficiency that is caused by relocation from a virtual volume to a general volume.

11. The relocation system according to claim 1,
wherein the storage section stores an exclusive constraint that is represented by a definition of a set of virtual volumes that must not belong to a same pool, and
wherein the selection section selects a pool that satisfies an additional condition that a set of virtual volumes defined by the exclusive constraint do not belong to a same pool.

12. A relocation method for a virtual volume relocation system that comprises a storage, the storage comprising a plurality of pools and having one or more virtual volumes formed on the pools, the pools being formed by one or more general volumes, and the virtual volume relocation system further comprising a management server that manages the virtual volumes, wherein the management server comprises a storage section, a prediction section, a selection section, and a relocation section, the method comprising the steps of:
in response to a writing instruction to the one or more virtual volumes, allocating, by the storage, a storage area from the one or more general volumes forming the pools;
storing, by the storage section, a tier definition that consists of a plurality of conditions for classifying the pools into tiers,
wherein the conditions include at least a definition of a usage amount increase bias that is predicted in accordance with a trend in usage increase of a tier relative to the other tiers in the pool;
predicting, by the prediction section, time periods in consideration of the conditions in the storage section, the time periods indicating an amount of time before the pools are exhausted in a configuration after execution of relocation of the virtual volumes,
wherein the prediction section estimates an increase in a usage amount of the pools based on the usage amount increase bias defined per tier;
selecting, by the selection section, pools as destination candidates based on a result of prediction by the prediction section; and
executing, by the relocation section, the relocation of the virtual volume to one of the destination candidate pools selected by the selection section.

* * * * *